United States Patent
Ameri et al.

(10) Patent No.: US 10,689,986 B1
(45) Date of Patent: Jun. 23, 2020

(54) HIGH BLOWING RATIO HIGH EFFECTIVENESS FILM COOLING CONFIGURATIONS

(71) Applicant: United States of Americas as represented by the Adminstrator of NASA, Washington, DC (US)

(72) Inventors: Ali A. Ameri, Solon, OH (US); Vikram Shyam, Cleveland, OH (US)

(73) Assignee: United States of America as Represented by the Administrator of National Aeronautics and Space Administration, Washington, DC (US)

(*) Notice: Subject to any disclaimer, the term of this patent is extended or adjusted under 35 U.S.C. 154(b) by 265 days.

(21) Appl. No.: 15/728,941

(22) Filed: Oct. 10, 2017

Related U.S. Application Data

(63) Continuation-in-part of application No. 15/915,129, filed on May 31, 2013.

(60) Provisional application No. 61/654,355, filed on Jun. 1, 2012, provisional application No. 62/405,461, filed on Oct. 7, 2016.

(51) Int. Cl.
    *F01D 5/18* (2006.01)

(52) U.S. Cl.
    CPC .......... *F01D 5/187* (2013.01); *F05D 2220/32* (2013.01); *F05D 2260/202* (2013.01); *F05D 2260/2212* (2013.01)

(58) Field of Classification Search
    None
    See application file for complete search history.

(56) References Cited

U.S. PATENT DOCUMENTS

| | | | |
|---|---|---|---|
| 4,923,371 A * | 5/1990 | Ben-Amoz | F01D 5/186 415/115 |
| 6,092,982 A * | 7/2000 | Ikeda | F01D 5/186 137/806 |
| 6,183,197 B1 * | 2/2001 | Bunker | F01D 5/141 415/178 |
| 7,186,085 B2 | 3/2007 | Lee | |
| 7,296,972 B2 | 11/2007 | Liang | |
| 7,553,534 B2 | 6/2009 | Bunker | |
| 7,824,156 B2 * | 11/2010 | Dellmann | F01D 5/187 416/96 R |
| 8,371,814 B2 | 2/2013 | Ramachandran et al. | |
| 8,850,828 B2 | 10/2014 | Mongillo, Jr. et al. | |
| 8,905,713 B2 | 12/2014 | Bunker et al. | |
| 9,273,560 B2 | 3/2016 | Gleiner et al. | |
| 9,416,665 B2 | 8/2016 | Xu et al. | |
| 9,546,553 B2 | 1/2017 | Okita et al. | |
| 2009/0304494 A1 * | 12/2009 | Strock | F01D 5/186 415/1 |
| 2013/0206739 A1 | 8/2013 | Reed et al. | |

(Continued)

*Primary Examiner* — Kayla Mccaffrey
(74) *Attorney, Agent, or Firm* — Robert H. Earp, III

(57) ABSTRACT

A film cooled component is provided that includes a body having a cavity defined therein, wherein a coolant is supplied to the cavity cooling apertures having at least one channel defined on an inside surface. The coolant exits the cavity through the plurality of cooling apertures thereby providing a cooling effect to the body and the channel creates an air flow such that the air coolant moves towards the body upon exiting the plurality of cooling apertures. The film cooled component may include cooling apertures configured to reverse blow coolant air.

17 Claims, 30 Drawing Sheets

(56) References Cited

U.S. PATENT DOCUMENTS

2015/0159871 A1   6/2015  Pearson et al.
2016/0273363 A1*  9/2016  Bunker .................. F01D 9/065

* cited by examiner

HIGH BLOWING RATIO HIGH EFFECTIVENESS FILM COOLING CONFIGURATIONS

CROSS-REFERENCE TO RELATED APPLICATIONS

This application claims the benefit of U.S. Provisional Patent Application Ser. No. 62/405,461 entitled "HIGH BLOWING RATIO HIGH EFFECTIVENESS FILM COOLING CONFIGURATIONS" filed on Oct. 7, 2016 and is a Continuation-in-Part of U.S. patent application Ser. No. 15/915,129 entitled "FILM COOLED SURFACE" filed on May 31, 2013, which claims the benefit of U.S. Provisional Patent Application Ser. No. 61/654,355 entitled "PAIRED THREADED FILM COOLING HOLES FOR IMPROVED TURBINE FILM COOLING" filed on Jun. 1, 2012. The entirety of each of the above-noted applications is incorporated by reference herein.

ORIGIN OF THE INVENTION

The invention described herein was made in the performance of work under a NASA contract and is subject to the provisions of Section 305 of the National Aeronautics and Space Act, Public Law 111-314, § 3 (124 Stat. 3330, 51 U.S.C. Chapter 201)".

BACKGROUND

A turbine engine includes a compressor, a combustor, and a turbine or turbine airfoil. The compressor is upstream from the combustor and is configured to pressurize fluids, such as gases or air, for the combustor. The combustor can have a combustion chamber where fuel and the pressurized fluid are combined and combusted. The turbine, which is downstream from the combustor, extracts energy from the combustor and is used to drive the compressor. One or more turbine blades of a turbine are turned by hot, combusted gas generated by the combustor, thereby driving the turbine engine.

As technology advances, turbine engine designers have endeavored to increase combustor exit temperatures and high-pressure turbine stage inlet temperatures to achieve improved efficiency and reduce fuel consumption. However, these increased temperatures can compromise the integrity of turbine components, such as the turbine blades. Since turbine performance corresponds to a cooling of external surfaces of the turbine, such as a surface on a high-pressure side of a turbine blade, it is generally desirable to provide uniform cooling thereto. Accordingly, to mitigate failure of turbine blades resulting from excessive operating temperatures, film cooling may be incorporated into turbine blade designs.

In film cooling, cool air is bled from the compressor, ducted to one or more internal chambers of the turbine blades, and discharged via one or more cooling apertures to form one or more cooling jets. For example, a cooling aperture couples an internal cavity or chamber of a turbine blade to a surface of the turbine blade. To this end, cool air or gas which is cooler than a free stream can be passed from the compressor to an internal chamber of a turbine blade, to an external surface of the turbine blade, and take form as a cooling jet. As a result of the cooling jets, convective heat transfer to the surface of the turbine blade can be reduced. Cooling apertures can have a round cross-section, and be oriented at an angle to an external surface of the turbine blade. These cooling jets can be configured to provide a thin, cool, insulating, boundary layer along the external surface of the turbine blade.

However, film cooling may not be effective when a cooling jet detaches, lifts off, or does not adhere to an external surface of a turbine blade. For example, at momentum ratios above about 0.5, a counter-rotating vortex pair, such as a kidney vortex, is often formed. This counter-rotating vortex pair can cause the cooling jet to separate or lift-off from the surface at a sufficiently high blowing ratio. When lift-off occurs, the cooling jet is lifted away from the surface of the turbine blade, thereby reducing film cooling effectiveness.

SUMMARY

The following presents a simplified summary in order to provide a basic understanding of some aspects of the innovation. This summary is not an extensive overview of the innovation. It is not intended to identify key/critical elements or to delineate the scope of the innovation. Its sole purpose is to present some concepts of the innovation in a simplified form as a prelude to the more detailed description that is presented later.

In an aspect of the innovation disclosed herein is a film cooled component that includes a body having a cavity defined therein, wherein a coolant is supplied to the cavity and a plurality of cooling apertures having at least one channel defined on an inside surface, wherein the coolant exits the cavity through the plurality of cooling apertures thereby providing a cooling effect to the body, and wherein at least one channel creates an air flow such that the air coolant moves towards the body upon exiting the plurality of cooling apertures.

In another aspect of the innovation, the at least one channel includes a plurality of cooling channels, and wherein the plurality of cooling channels are oriented in a same helical direction.

In yet another aspect of the innovation, the at least one channel includes a first cooling channel oriented in a first helical direction and a second cooling channel oriented in a second helical direction that is different from the first helical direction such that the first cooling channel and the second cooling channel intersect.

The innovation further includes one or more embodiments of techniques or systems for shaped recess flow control are provided herein. A shaped recess or cavity can be formed on a surface associated with fluid flow, such as a turbine blade of a turbine airfoil. The shaped recess can be configured to create or induce one or more fluid effects, one or more temperature effects, or one or more shedding effects which may interact with or impact a free stream flow or one or more additional flow structures, such as a cooling jet, for example. In one or more embodiments, the shaped recess can be a v-shaped recess (v-cess) or a portion of a v-cess. For example, the shaped recess can include one leg or a portion of a leg of a v-cess. Additionally, one or more legs of a v-cess or a portion of a v-cess can include steps, regions, phases, stages, contours, etc., such as staggered regions, non-linear regions, rounded regions, etc.

It will be appreciated that one or more characteristics or one or more attributes of a shaped recess can be adjusted based on one or more desired effects. For example, a depth, length, width, one or more angles associated with a shaped recess, placement, arrangement, etc. of a shaped recesses can be adjusted. In other words, a variety of shaped recesses can be formed. Additionally, a shaped recess can be paired with one or more cooling channels or other structures. For example, a shaped recess, such as a v-cess, may interact with a cooling channel based on a position of the v-cess relative to the cooling channel. The shaped recess can be upstream or downstream of the cooling channel and can be placed at different coordinates to different effects.

In one or more embodiments, the shaped recess can be configured to introduce an amount of turbulence into a boundary layer between a surface and a free stream. For example, when a shaped recess is upstream from a cooling channel or film cooling channel, the shaped recess introduces turbulence that mitigates lift off of a cooling jet from the cooling channel. Because the cooling jet interacts with or combines with the boundary layer on the surface, turbulence from the shaped recess enhances the ability of the boundary layer to 'stick' to the surface.

One or more shaped recesses can be configured or arranged to mitigate a counter-rotating vortex pair or a kidney vortex such that an inverse counter-rotating vortex pair or an inverse kidney vortex is formed when a free stream passes over one or more of the shaped recesses. By mitigating or cancelling a counter-rotating vortex pair or a kidney vortex of a cooling jet, film cooling efficiency can be enhanced, because a likelihood that the cooling jet will lift off is reduced by interaction between the inverse counter-rotating vortex pair and the counter-rotating vortex pair.

Additionally, a shaped recess can be configured to restart a boundary layer on a surface associated with fluid flow. For example, a slow moving portion of a boundary layer can be swallowed by the shaped recess. This enables the boundary layer to have a faster velocity downstream of the shaped recess by contrast to a slower velocity upstream of the shaped recess. Additionally, it will be appreciated that this faster velocity effectively reduces the blowing ratio between the free stream and the boundary layer. This reduced blowing ratio generally helps keep a cooling jet or a boundary layer attached to the surface, thereby enhancing film cooling.

In one or more embodiments, a shaped recess coupled with a cooling channel downstream of the shaped recess can be configured to draw cool air from a cooling jet of the cooling channel upstream, because a horseshoe vortex associated with the cooling channel interacts with vortices associated with the shaped recess. Higher pressure from the horseshoe structure can push a portion of flow or cool air from the cooling jet back into the shaped recess, thereby enhancing film cooling.

Additionally, a shaped recess may cause stagnation pressure coupled with cooling channel to be lower than surrounding stagnation pressure, enabling coolant to spread laterally.

In yet another aspect of the innovation disclosed herein is a system that increases a film cooling effectiveness for a film cooled body at least one cooling aperture defined in a surface of the film cooled body; at least one cooling channel defined on an inside surface of the at least one cooling aperture; and a coolant provided through the at least one cooling aperture, wherein at least one channel creates an air flow such that the coolant moves towards the surface upon exiting the at least one cooling aperture.

The hot gases entering the turbine stage of the jet engine reach temperatures of up to 2000K. The thermal limit of blade materials is below this temperature. Thus, it is necessary to cool the blades for proper functioning. Currently, cooling means can include a thermal barrier coating, impingement cooling; film cooling, or, often, a combination of all three.

Use of film cooling results in the film cooling air mixing with the mainstream air causing aerodynamic losses. At high blowing ratios (e.g., a blowing ratio of 2.0 or greater), the cooling air can "jet" or "blow off" allowing the hot gas to cover the surface and can lead to a dramatic reduction in cooling. The blowing ratio is the ratio of the mass flow rate per unit area through the cooling hole to that of the free stream (e.g., the hot gas flowing over the airfoil/flat plate). This could occur in transient operation. It is desirable to keep the film cooling jet attached to the blade surface and also to spread the jet in the span wise direction to improve cooling effectiveness.

Various solutions have been proposed that involve geometric modifications to the blade such as shaped holes or designs that attempt to change the vorticity in the vicinity of the coolant mainstream mixing region. All these configurations offer incremental advances and often any benefits are offset by complications in manufacturing or increased losses. It is desirable to find a simple solution to the high blowing ratio low effectiveness problem.

According to an aspect, the innovation provides a system and method for a high blowing ratio high effectiveness design that is largely independent of changes in blowing ratio.

According to an aspect, the innovation provides at least one cooling aperture (hole) through which air flows in an upstream direction (i.e., flows upstream of the external flow direction). In one embodiment, the holes may be placed downstream of a step to reduce mixing losses. In one embodiment, the holes may be shaped to spread the jet and reduce loss. In one embodiment, fences may be used upstream of the holes to bend the coolant air back toward the downstream direction to reduce mixing losses. Use of a design according to the innovation including cooling holes with or without fences dramatically improved the effectiveness for the high blowing ratio cases even beyond blowing ratios of 4.0.

To accomplish the foregoing and related ends, certain illustrative aspects of the innovation are described herein in connection with the following description and the annexed drawings. These aspects are indicative, however, of but a few of the various ways in which the principles of the innovation can be employed and the subject innovation is intended to include all such aspects and their equivalents. Other advantages and novel features of the innovation will become apparent from the following detailed description of the innovation when considered in conjunction with the drawings.

DETAILED DESCRIPTION

Figure 1:
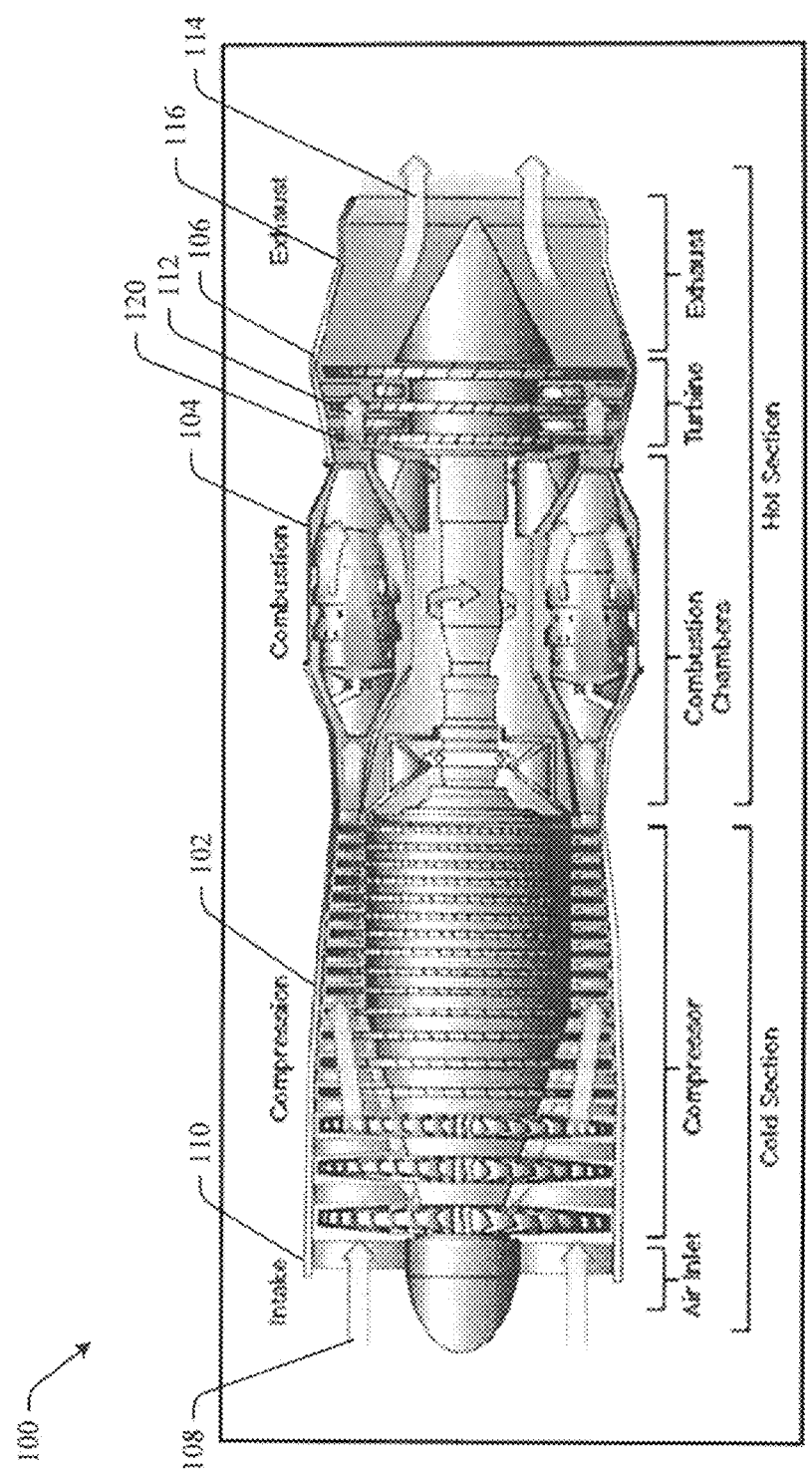
FIG. 1 is an example illustration of a gas turbine engine in accordance with aspects of the innovation.

The innovation is now described with reference to the drawings, wherein like reference numerals are used to refer to like elements throughout. In the following description, for purposes of explanation, numerous specific details are set forth in order to provide a thorough understanding of the subject innovation. It may be evident, however, that the innovation can be practiced without these specific details. In other instances, well-known structures and devices are shown in block diagram form in order to facilitate describing the innovation.

While specific characteristics are described herein (e.g., thickness), it is to be understood that the features, functions and benefits of the innovation can employ characteristics that vary from those described herein. These alternatives are to be included within the scope of the innovation and claims appended hereto.

While, for purposes of simplicity of explanation, the one or more methodologies shown herein, e.g., in the form of a flow chart, are shown and described as a series of acts, it is to be understood and appreciated that the subject innovation is not limited by the order of acts, as some acts may, in accordance with the innovation, occur in a different order and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the innovation.

The innovation disclosed herein provides a system and method that improves a film cooling process for a film cooled component in accordance with an aspect of the innovation. The system and method includes threading film cooling holes with helical channels or grooves (similar to the threads of a screw) for the purpose of producing a swirling flow of a cooling fluid exiting the film cooling hole. In other words, the cooling fluid enters a cavity inside a body of the film cooled component via a passage and then exits through one or more cooling holes to cool a surface of the component. Adjacent film cooling holes can be paired such that the paired holes can have a swirling flow in an opposite direction or in the same direction. As will be seen further below, the combined airflow from the paired film cooling holes affects the flow of a mainstream flow thereby improving film cooling effectiveness. As a result, a distance between film cooling holes can be increased due to the improved film cooling effectiveness, which in turn would reduce the amount of coolant flow required for film cooling thereby increasing efficiency.

U.S. Pat. No. 9,644,903 entitled "Shaped Recess Flow Control" describes techniques or systems for shaped recess flow control, including shaped recesses or cavities formed on a surface associated with fluid flow, such as a turbine blade of a turbine airfoil to create or induce one or more fluid effects, one or more temperature effects, or one or more shedding effects which may interact with or impact a free stream flow or one or more additional flow structures, such as a cooling jet and is hereby incorporated by reference in its entirety.

In one embodiment, the innovation provides a system or method for injecting coolant air in a direction that does not align with the direction of the free stream air. This is "reverse blowing." In one embodiment, the innovation may provide a system or method in which at least one cooling hole is angled such that it injects coolant air in a direct that is opposite the direction of the free stream air. This can be accomplished by placing the cooling apertures facing the flow of the free stream air.

It is to be understood that the innovation described herein can be used on many applications relating to film cooling or airflow control. Some example applications may include turbine film cooling on jet, turbojet, or turboprop engines, on gas turbines for power generation, on combustion liners, high pressure turbine blades, etc. The innovative embodiment disclosed herein will be described and illustrated in relation to an example gas turbine engine. Thus, the example embodiment disclosed herein is for illustrative purposes only and is not intended to limit to scope of the innovation.

Referring now to the drawings, FIG. 1 is an illustration of an example gas turbine engine (hereinafter "engine") 100 incorporating the innovative film cooled system and method in accordance with an aspect of the innovation. The engine 100 includes a compressor 102, combustion chambers 104 and a turbine 106. Incoming air 108 through an intake 110 is compressed, thus increasing the pressure (high pressure) of the air, as the air travels through the compressor 102. The combustion chambers 104 ignite the high pressure air thus, creating a high temperature, high velocity gas (also known as the free stream gas) 112, which in turn drives the turbines 106. Excess gasses 114 are exhausted via an exhaust 116. As mentioned above, the free stream gas 112 has a high temperature that can compromise the integrity of the turbine components, such as turbine blades 118.

Figure 2:
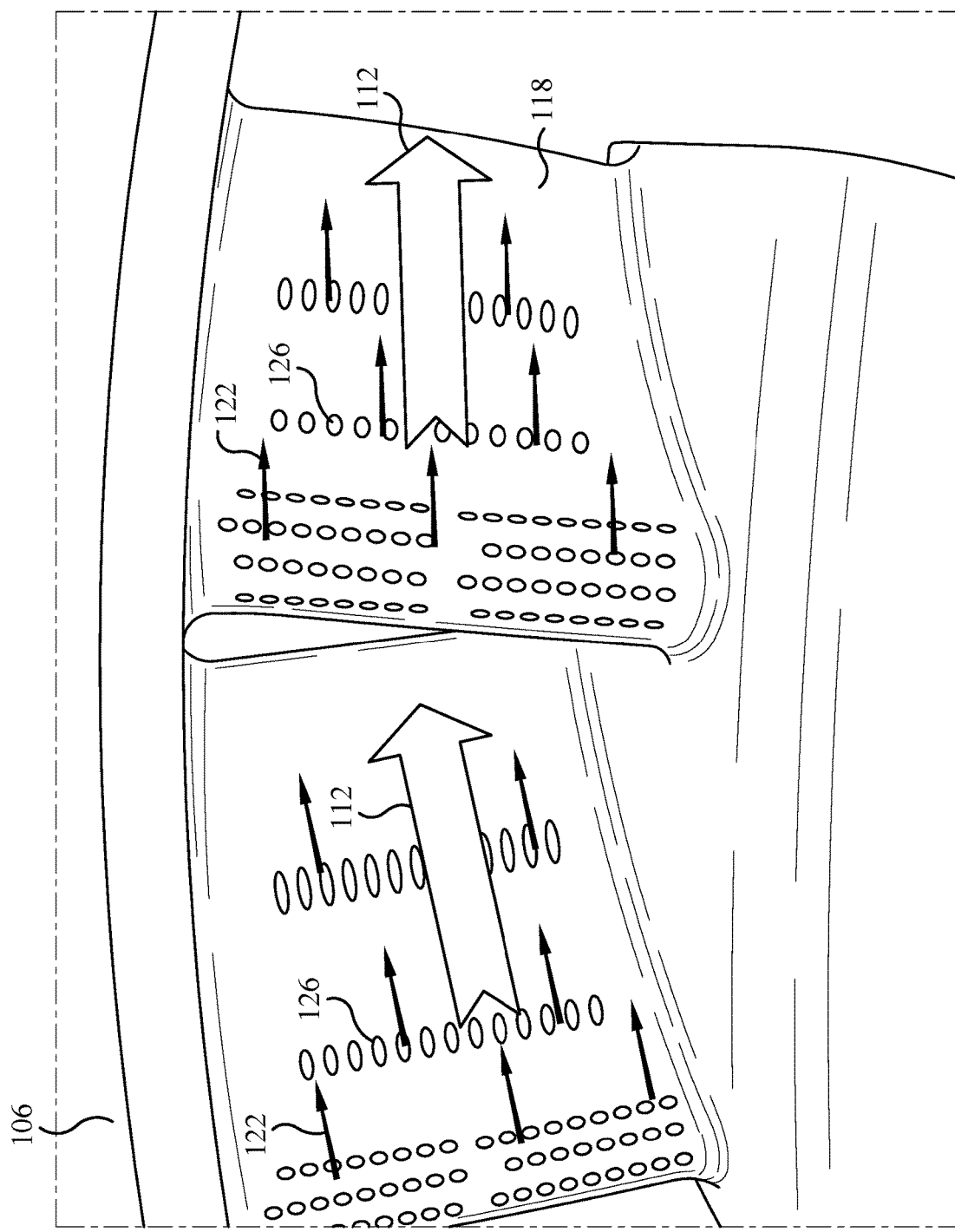
FIG. 2 is a close-up view of a turbine blade in accordance with an aspect of the innovation.
Figure 3:
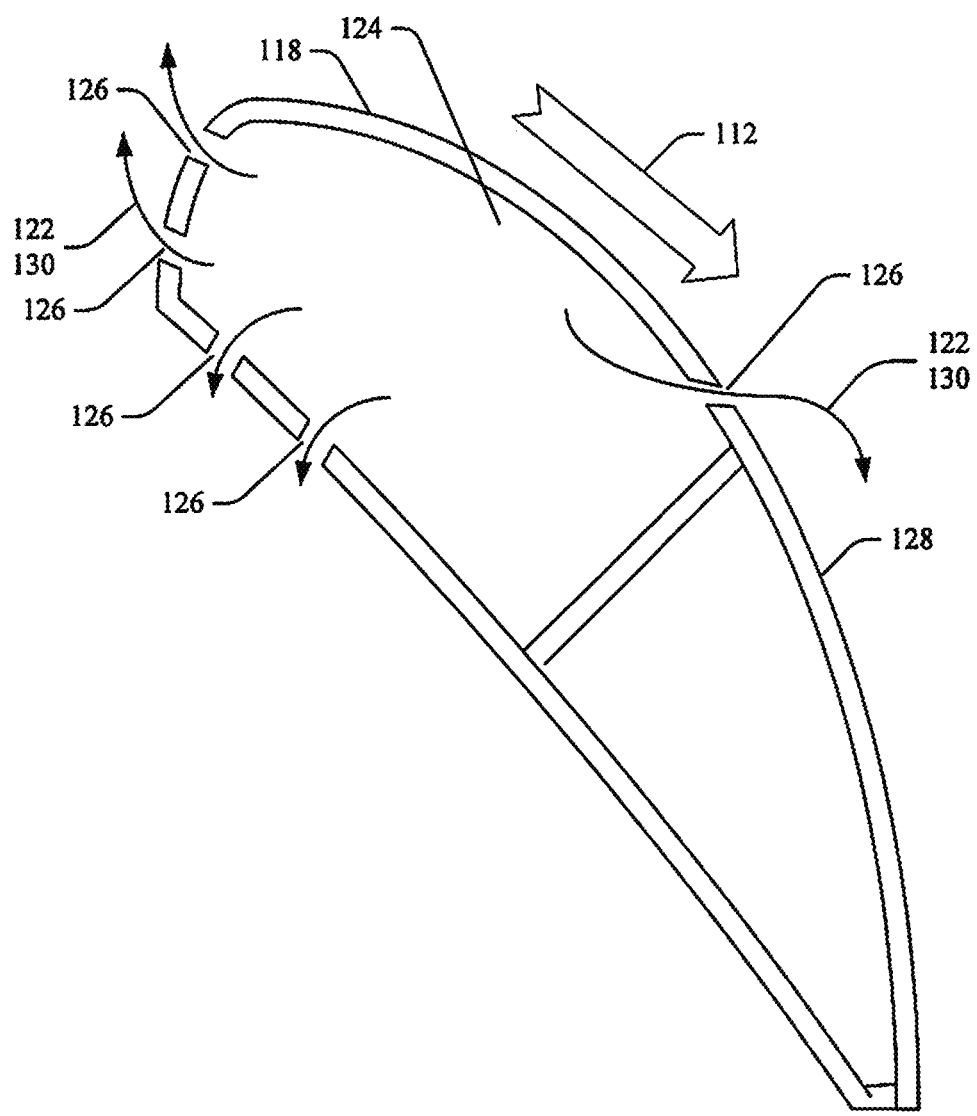
FIG. 3 is cross-sectional view of the turbine blade in FIG. 2 in accordance with aspects of the innovation.

Referring to FIGS. 2 and 3, in order to facilitate cooling of the turbine blades (body) 118, a cooling fluid 122, such as relatively cool air from the compressor 102, can be ducted to a cavity or chamber 124 inside the turbine blades 118. The cooling fluid 122 has a temperature less than the temperature of the free stream gas 112. The cooling fluid 122 then passes from the cavity 124 through cooling apertures 126 to a surface 128 of the turbine blades 118 thereby providing a cooling jet stream 130 to cool the turbine blades 118. The cooling fluid 122 interacts or mixes with the free stream gas 112 thereby reducing the free stream gas temperature, which in turn reduces the turbine blade temperature (or wall temperature). One or more different cooling apertures 126 may be used for different portions of the turbine blade 118, such as areas associated with hot spots or higher pressure.

It is desired to introduce the cooling jet stream 130 into a boundary layer without a substantial increase in turbulence. The cooling jet stream 130 can form a cool boundary layer on the surface 128 of the turbine blade 118. In other words, the cooling jet stream 130 can lay a cool film on the surface 128 of the turbine blade 118 such that the cool film or boundary layer cools the surface 128 relative to a free stream 112. For example, the cooling jet stream 130 can provide film cooling by reducing heat transfer from the free stream 112 to the surface 128 of the turbine blade 118. As mentioned above, because the cooling jet stream 130 includes gas which is cooler than the free stream 112, a temperature of the surface 128 of the turbine blade 118 is reduced.

It is also desired to mitigate separation between the cooling jet stream 130 and the surface 128 of the turbine blade 118 to enhance film cooling effectiveness (a measure for how well the surface is being cooled). In regards to film cooling effectiveness, it is desired to have the temperature of the surface 128 ($T_{surface}$) of the turbine 118 be substantially equal to the temperature of the coolant ($T_{coolant}$) or the temperature of the cooling jet stream 130. Thus, it is desired to have the cooling jet stream 130 be essentially attached to the surface 128 of the turbine blade 118.

Separation occurs when the cooling jet stream 130 separates from the surface 128 of the turbine blade 118, which in turn would not only decrease film cooling effectiveness, but may also increase drag. Pressure within the cavity 124 of the turbine blade 118 is often greater than the pressure exterior to the turbine blade 118, known as the high pressure side of the turbine blade 118, thereby facilitating cooling fluid 122 flow from the cavity 124 to the outside of the turbine blade 118. As the internal pressure increases, a likelihood of cooling jet stream 130 separation may increase, where the cooling jet stream 130 separates from the surface 128, thereby decreasing film cooling efficiency.

Figure 4:
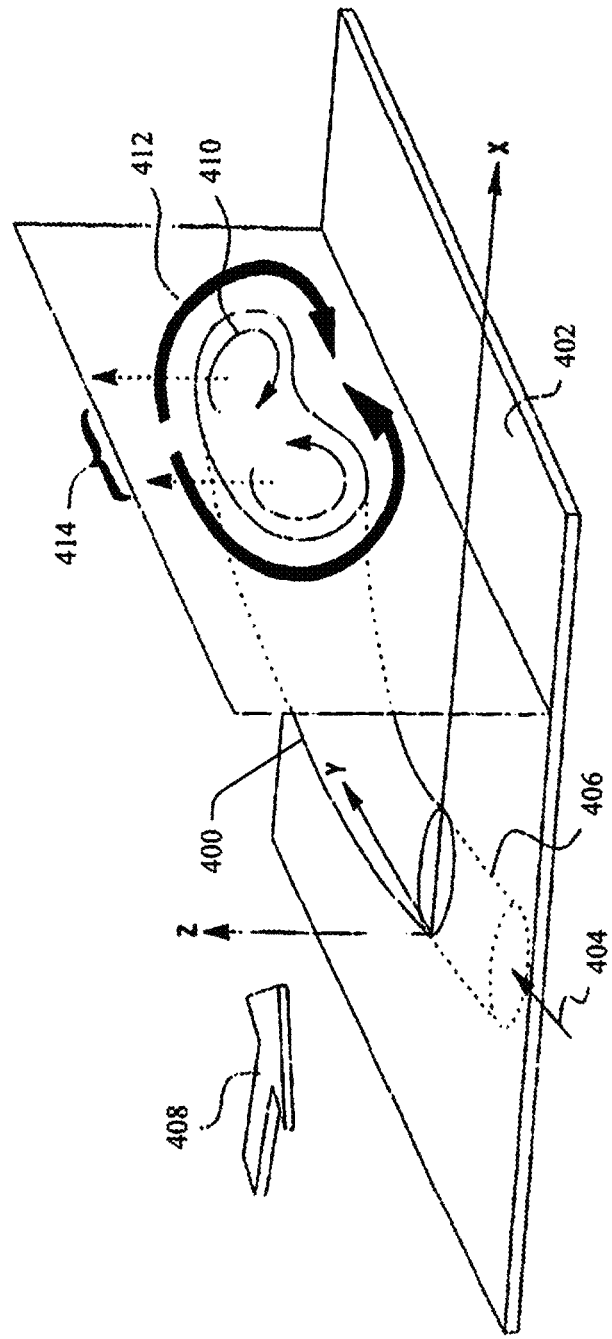
FIG. 4 is an example illustration of a fluid flow from a conventional cooling aperture in accordance with an aspect of the innovation.
Figure 5:
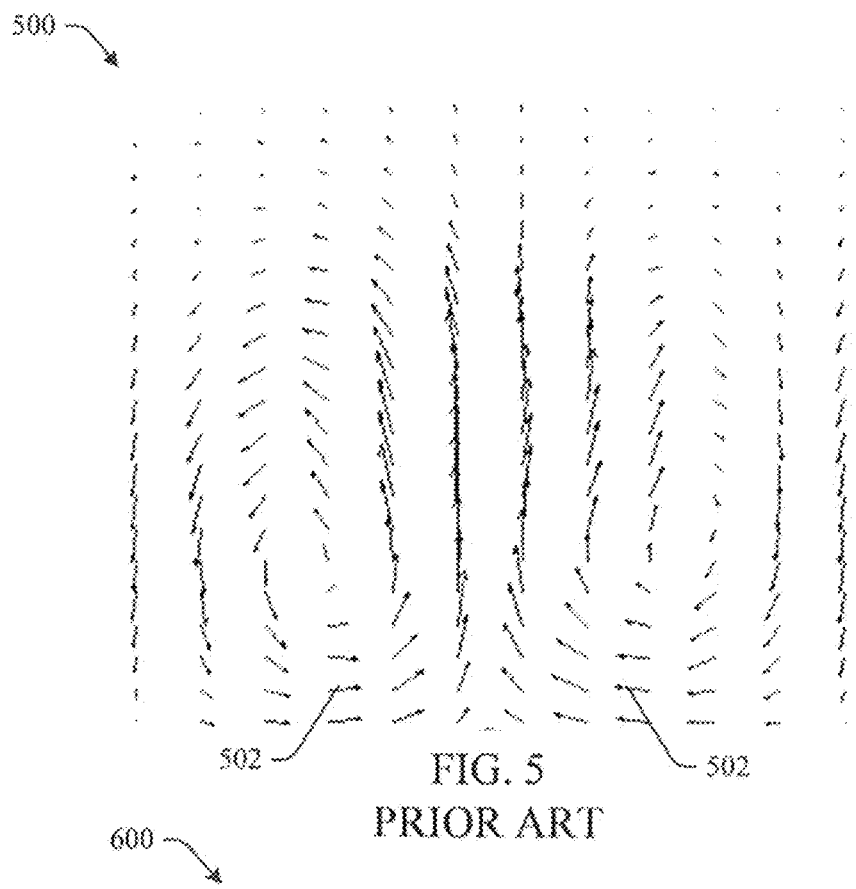
FIG. 5 is a vector diagram illustrating the fluid flow from the conventional cooling aperture in accordance with an aspect of the innovation.
Figure 6:
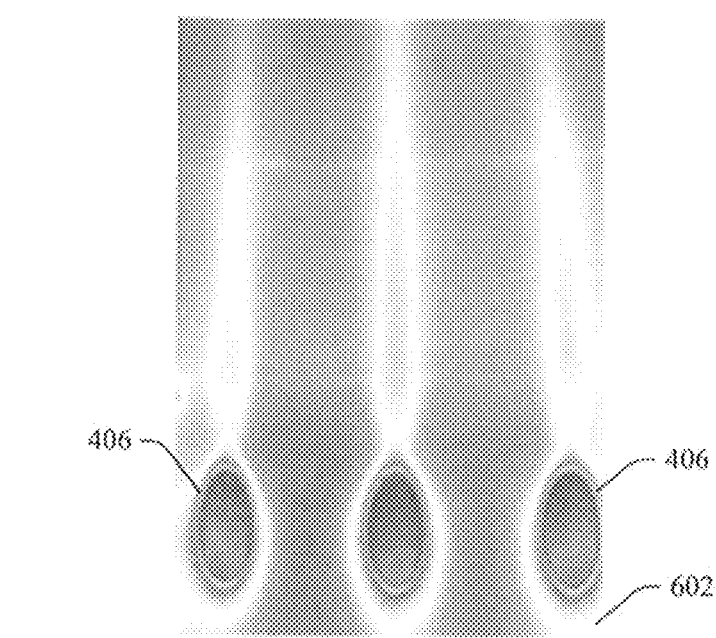
FIG. 6 is a thermal graph illustrating a temperature distribution from the conventional cooling aperture in accordance with aspects of the innovation.

Referring to FIGS. 4-6, an example of cooling jet stream 400 separating from a surface 402 is illustrated in FIG. 4. The cooling jet stream 400 is generated from a cooling fluid 404 flowing through a conventional cooling aperture 406, which has a smooth inside surface. The cooling jet stream 400 exiting the cooling aperture 406 mixes with the free stream gas 408 passing over the surface 402 and forms a counter rotating vortex pair 410, which is also illustrated in the vector diagram 500 in FIG. 5 by the counter rotating arrows 502. The counter rotating vortex pair 410 is associated with a vorticity field as indicated by the curved arrows 412. The vorticity field 412 can cause the cooling jet stream 400 to separate from the surface 402, as indicated by the arrows 414, thus, reducing the film cooling effectiveness.

The effect of the film cooling effectiveness is illustrated in the thermal graph 600 in FIG. 6. Due to the counter rotating flows from the cooling apertures 406 described above, the temperature of the gas (i.e. the mixture of the cooling jet stream and the free stream gas) closest to the surface (i.e. the bottom 602 of the graph) and between adjacent cooling apertures 406 is at its hottest, as indicated by the color red.

Thus, as clearly described above and illustrated in FIGS. 4-6, the conventional cooling aperture does not increase film cooling effectiveness, but rather decreases it. On the other hand, the innovative film cooling system and process disclosed herein and subsequently described, improves the film cooling effectiveness by incorporating one or more channels (i.e., threading) into an inside surface of the cooling apertures.

Figure 7A:
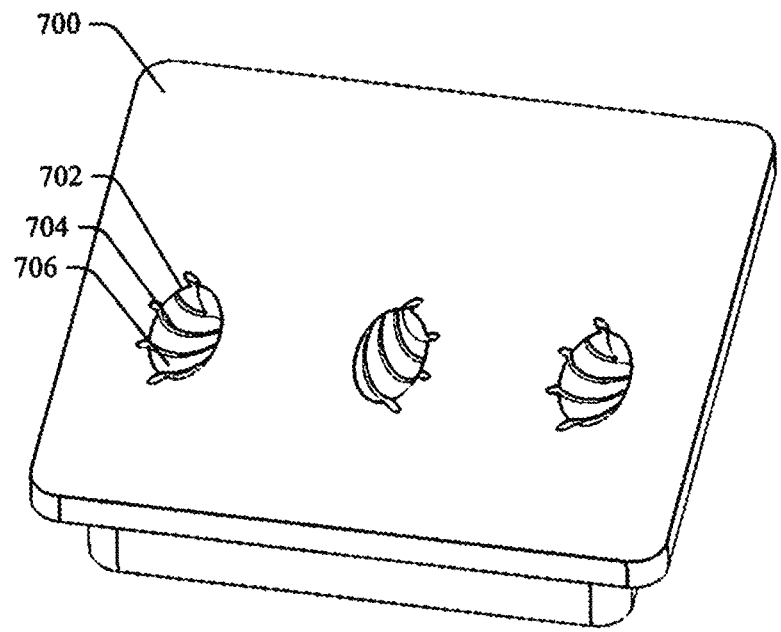
FIG. 7A is a perspective view of an example embodiment of an innovative cooling aperture in accordance with an aspect of the innovation.
Figure 7B:
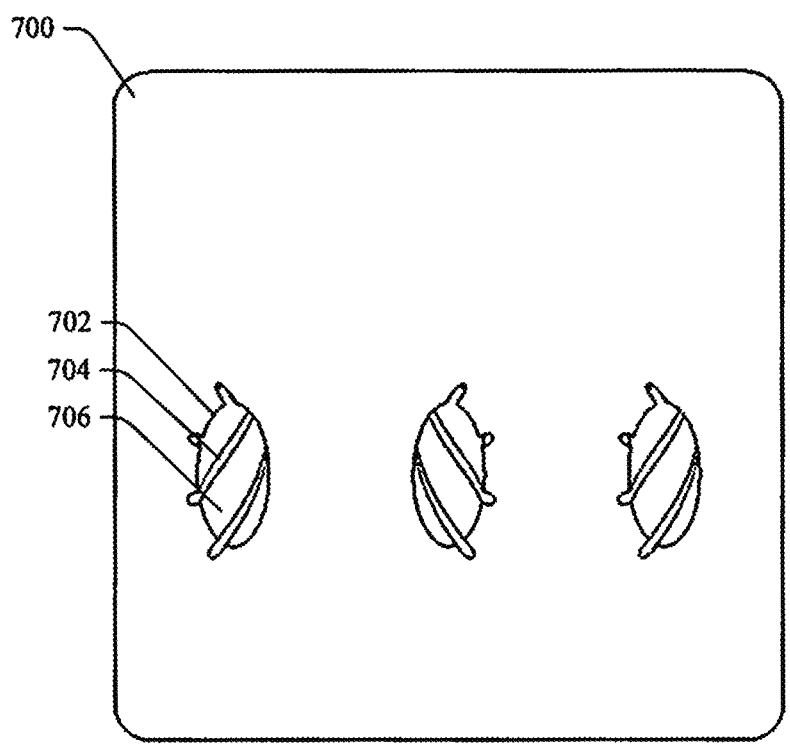
FIG. 7B is a top view of the example embodiment of the innovative cooling aperture of FIG. 7A in accordance with an aspect of the innovation.

FIGS. 7A and 7B are perspective and top views respectively of a surface 700 subject to film cooling that includes one example embodiment of the innovative cooling apertures 702 in accordance with an aspect of the innovation. The cooling apertures 702 include cooling channels 704 defined on an inside surface 706 of the cooling apertures 702 to facilitate the enhancement of film cooling effectiveness. In the example embodiment illustrated in FIGS. 7A and 7B, the cooling channels 704 in a given cooling aperture 702 are oriented in the same helical or spiral direction, similar to the orientation of threads on a screw and may have the same width or depth throughout. In addition, the cooling channels 704 may extend the entire length of the cooling aperture 702. In other words, the cooling channels 704 may begin at one end (for example the end nearest the cavity shown in FIG. 3) and extend through the cooling aperture 702 to the other end to the surface 700.

Figure 8:
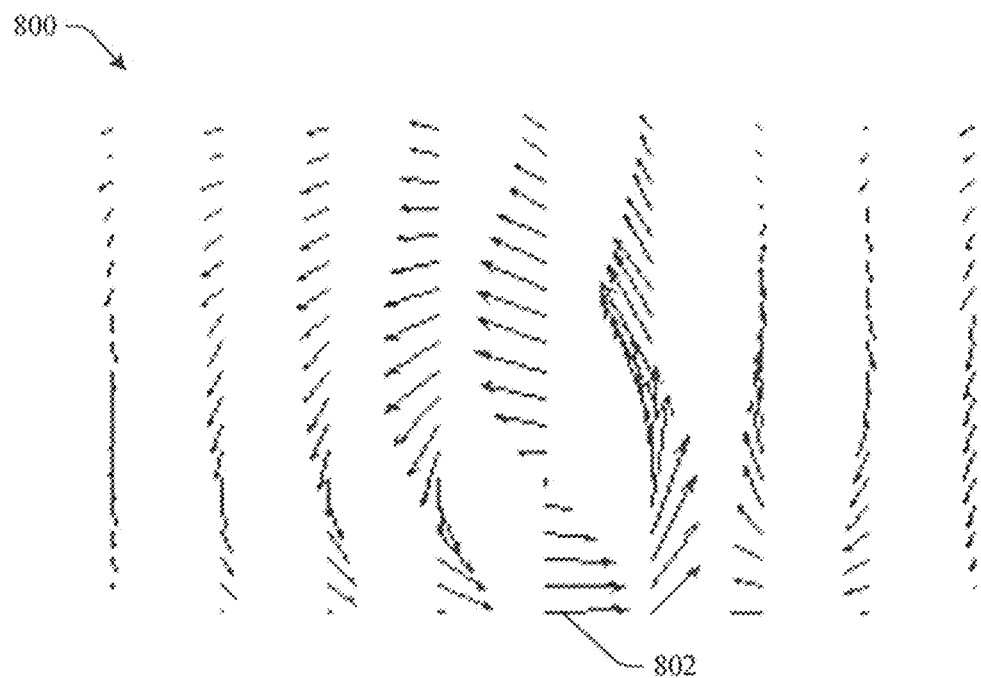
FIG. 8 is a vector diagram illustrating a fluid flow from the innovative cooling aperture illustrated in FIGS. 7A and 7B in accordance with an aspect of the innovation.
Figure 9:
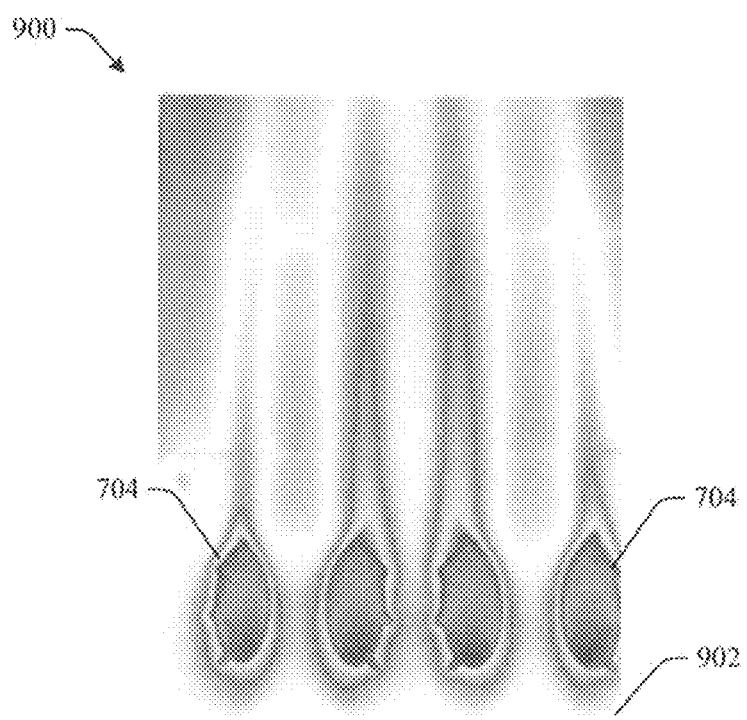
FIG. 9 is a thermal graph illustrating a temperature distribution from the innovative cooling aperture of FIGS. 7A and 7B in accordance with aspects of the innovation.

The cooling channels 704 create an air flow (or cooling jet stream) that facilitates the enhancement of film cooling effectiveness. Specifically, referring to FIG. 8, FIG. 8 is an illustration of a vector diagram 800 that shows the air flow of the cooling jet stream (i.e., the cooling fluid) exiting the cooling aperture 702. As shown by the orientation of the arrows 802, the counter rotating vortex pair described above does not form nor does the associated vorticity field. Rather, a swirling air flow occurs that forces the cooling jet stream toward the surface. This effect is apparent from the thermal graph 900 illustrated in FIG. 9. In the thermal graph 900, cooler temperatures are shown in yellow and green and the hotter temperatures are shown in red. As shown, the cooler temperatures are closer to the surface (i.e., the bottom 902 of the graph) thus, indicating that the jet cooling stream is forced toward the surface thereby enhancing film cooling effectiveness.

Figure 10A:
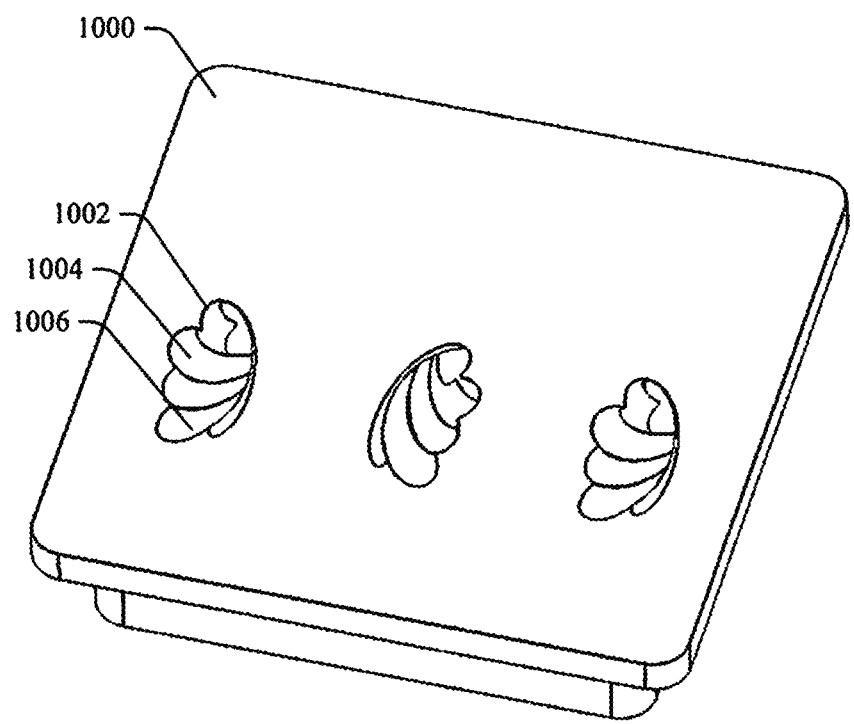
FIG. 10A is a perspective view of another example embodiment of an innovative cooling aperture in accordance with an aspect of the innovation.
Figure 10B:
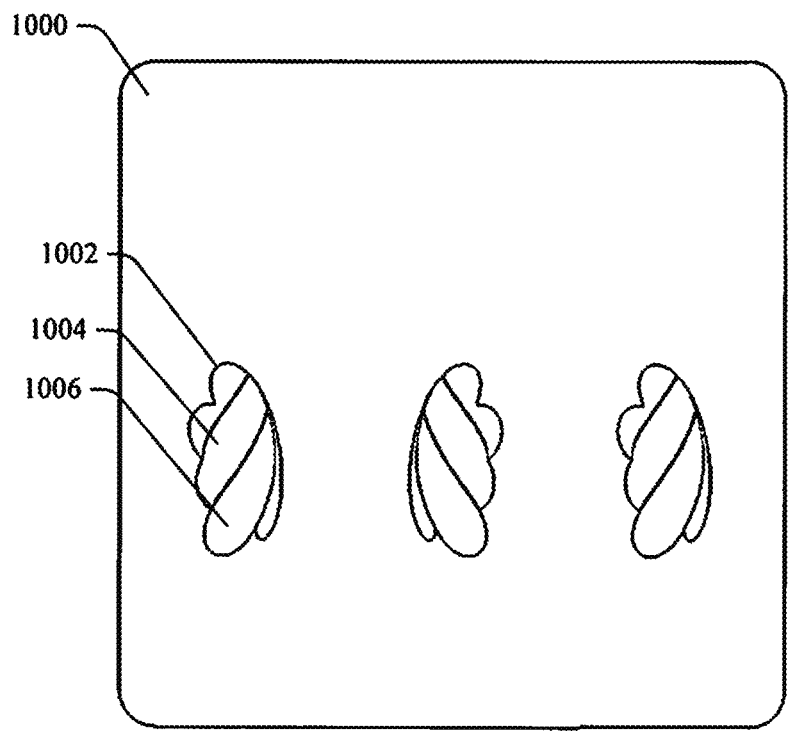
FIG. 10B is a top view of the example embodiment of the innovative cooling aperture of FIG. 10A in accordance with an aspect of the innovation.

FIGS. 10A and 10B are perspective and top views respectively of a surface 1000 subject to film cooling that includes another example embodiment of the innovative cooling apertures 1002 in accordance with an aspect of the innovation. The cooling apertures 1002 in this example embodiment are similar to the cooling apertures illustrated in FIGS. 7A and 7B in that they include cooling channels 1004 defined on an inside surface 1006 of the cooling apertures 1002 to facilitate the enhancement of film cooling effectiveness. In this example embodiment, as above, the cooling channels 1004 in a given cooling aperture 1002 are oriented in the same direction, similar to the orientation of threads on a screw. In addition, the cooling channels 1004 may extend the entire length of the cooling aperture 1002 and may have the same radius or depth throughout. In this embodiment, however, the cooling channels 1004 are wider than the cooling channels 704 above.

Figure 11A:
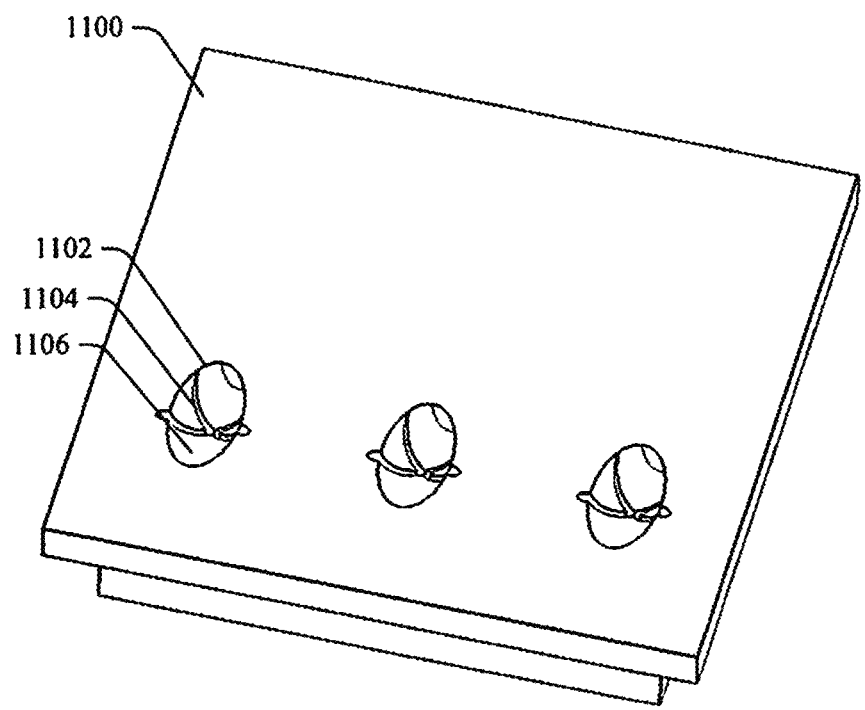
FIG. 11A is a perspective view of another example embodiment of an innovative cooling aperture in accordance with an aspect of the innovation.
Figure 11B:
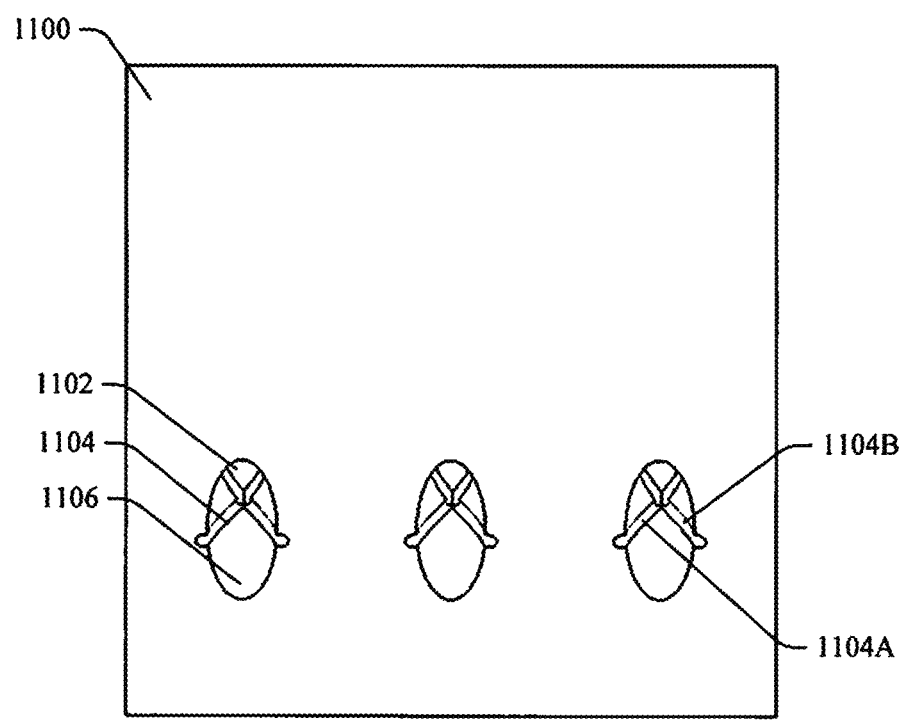
FIG. 11B is a top view of the example embodiment of the innovative cooling aperture of FIG. 11A in accordance with an aspect of the innovation.

FIGS. 11A and 11B are perspective and top views respectively of a surface 1100 subject to film cooling that includes yet another example embodiment of the innovative cooling apertures 1102 in accordance with an aspect of the innovation. The cooling apertures 1102 in this example embodiment are similar to the cooling apertures illustrated in FIGS. 7A and 7B in that they include cooling channels 1104 defined on an inside surface 1106 of the cooling apertures 1102 to facilitate the enhancement of film cooling effectiveness. In this embodiment, however, the cooling channels 1104 within a given cooling aperture 1102 are oriented in different helical directions, referred to herein as a crisscross pattern.

In this embodiment, the cooling channels 1104 are comprised of a first cooling channel 1104A oriented or threaded in a first direction and a second cooling channel 1104B oriented or threaded in a second or opposite direction from the first direction such that the first and second cooling channels 1104A, 1104B intersect. Although, FIGS. 11A and 11B illustrate a first and second cooling channel 1104A, 1104B, it is to be understood that the cooling aperture 1102 may include any number of cooling channels. Further, it is not necessary to have the number of cooling channels oriented in the first direction the same as the number of cooling channels oriented in the second direction. In addition, the cooling channels 1104 may extend the entire length of the cooling aperture 1102 and may have the same radius or depth throughout. Thus, the example embodiment illustrated in FIGS. 11A and 11B is for illustrative purposes only and is not intended to limit the scope of the innovation.

It is to be understood that the example embodiments described above and illustrated in FIGS. 7A, 7B, 10A, 10B, 111A and 11B are for illustrative purposes only and are not intended to limit the scope of the innovation. For example, each cooling aperture can include any number of cooling channels oriented in any and/or different directions. The cooling channels may be any width and may have a narrowing or expanding width. The cooling channels in different cooling apertures may be oriented in different directions. For a given application for a given surface, some apertures may include cooling channels and other cooling apertures may not include cooling channels. In addition, for a given application, one or more cooling apertures can be inclined or at an angle with respect to the surface and/or the free stream gas or can be angled with respect to each other.

Figure 12:
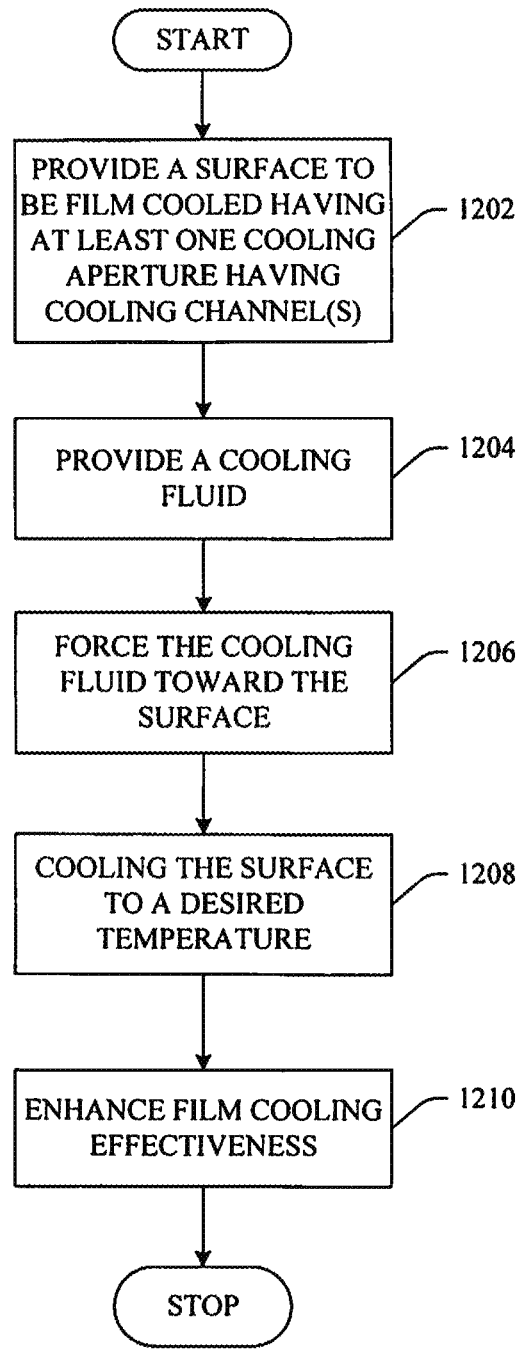
FIG. 12 is an example flow diagram illustrating a method of cooling a film cooled surface in accordance with an aspect of the innovation.

FIG. 12 is an example flow diagram illustrating a method of film cooling (or increasing film cooling effectiveness) in accordance with an aspect of the innovation. At 1202, a surface having at least one cooling aperture that includes at least one cooling channel defined on its inside surface is provided. At, 1204, providing a cooling fluid that enters one end of the cooling aperture and exits at the other end. At 1206, orienting the at least one cooling channel, such that interaction between the cooling fluid exiting the cooling aperture and a free stream gas forces the cooling fluid toward the surface. At 1208, cooling the surface to a desired temperature (wall temperature), such that the integrity of the surface is not compromised due to the temperature of the free stream gas. At 1210, enhancing film cooling effectiveness.

Figure 13:
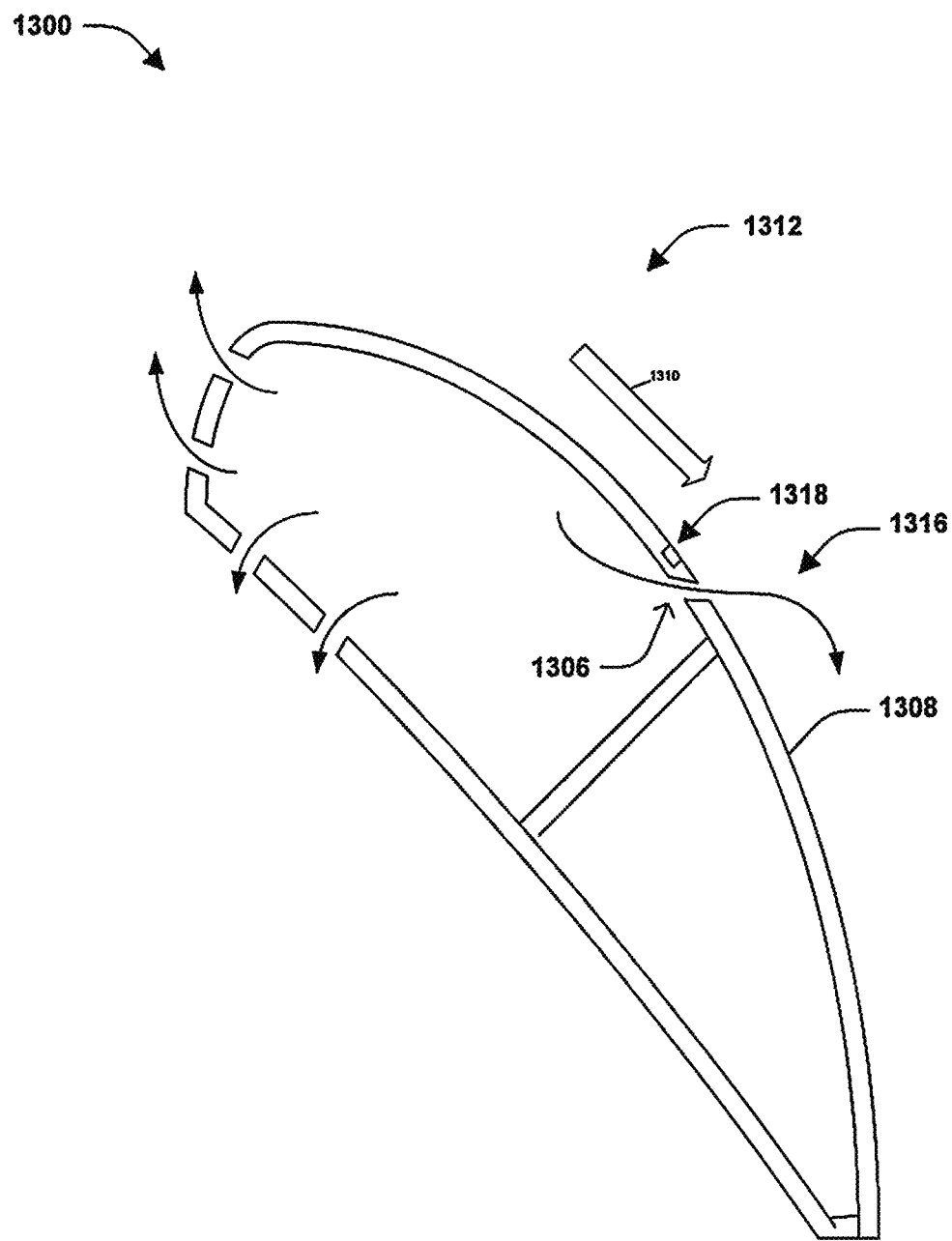
FIG. 13 is an illustration of a cross-sectional view of an example turbine blade, according to one or more embodiments.

Generally, a turbine engine is driven by passing hot air from a combustor to one or more turbines or turbine blades, causing the turbines to rotate. A high pressure side of the turbine blades faces the combustor, while a low pressure side of the turbine blades faces the exhaust. FIG. 13 is an illustration of a cross-sectional view 1300 of an example turbine blade, according to one or more embodiments. In FIG. 13, a turbine blade 1312 includes a surface 1308, a cooling channel 1306, and a shaped recess 18. Cooling channel 1306 couples an interior of the turbine blade 1312 with an exterior of the turbine blade 1312. Coolant fluid, such as relatively cool air, from the compressor can be ducted to the surface 1308 of the turbine blade 1312 to provide a cooling jet 1316. In other words, gas which is cooler than the free stream 1310 can be passed onto the external surface via slots or holes, such as cooling channel 1306. Additionally, one or more different cooling channels (not labeled) may be used for different portions of the turbine blade 1312, such as areas associated with hot spots or higher pressure, for example.

It is generally desirable to introduce the cooling jet 1316 into a boundary layer without a substantial increase in turbulence. The cooling jet 1316 can form a cool boundary layer on the surface 1308 of the turbine blade 1312. In other words, the cooling jet 1316 can lay a cool film on the surface 1308 of the turbine blade 1312 such that the cool film or boundary layer cools the surface 1308 relative to a free stream 1310. For example, the cooling jet 1316 can provide film cooling by reducing heat transfer from the free stream 1310 to the surface 1308 of the turbine blade 1312. Because the cooling jet 1316 includes gas which is cooler than the free stream 1310, a temperature of the surface 1308 of the turbine blade 1312 is reduced.

Additionally, it is generally desirable to enhance film cooling effectiveness and to mitigate separation. With regard to film cooling effectiveness, it is desired to have the temperature of the surface of the turbine ($T_{surface}$) be substantially equal to the temperature of the coolant ($T_{coolant}$) or the temperature of the cooling jet 1316. Because of this, it is desirable to have the cooling jet 1316 substantially attached to the surface 1308 of the turbine blade 1312. Further, it may also be desirable to reduce coolant usage or a number of cooling channels, because coolant or relatively cool fluid is taken from the compressor to facilitate film cooling, thereby reducing an amount of fluid seen by the combustor. In other words, when cooling is taken from the compressor, work done on the fluid by the compressor is not utilized for combustion.

Separation occurs when fluid, such as air, meets an obstruction and does not follow a streamline of the obstruction. For example, the fluid may become detached from a surface of an object, increase drag, or cause a leading edge to reverse flow direction.

Pressure within the cooling channel 1306 or internal to the turbine blade 1312 is often greater than the pressure exterior to the turbine blade 1312 or the high pressure side of the turbine blade 1312 to facilitate coolant flow from the inside of the turbine to the outside of the turbine. As the internal pressure increases, a likelihood of coolant jet 1316 lift off may increase, where the coolant jet 1316 detaches from the surface 1308, thereby decreasing film cooling efficiency. In one or more embodiments, the shaped recess 1318 can enhance film cooling effectiveness by introducing a small amount of turbulence that mitigates lift off of the cooling jet 1316, thereby keeping the cooling jet 1316 attached to the surface 1308 of the turbine blade 1312. The shaped recess 1318 can mitigate a counter rotating vortex pair, mitigate a kidney vortex, draw coolant upstream from the cooling channel 1316, split a flow into a high energy stream and a low energy stream, or introduce shedding, thereby mitigating separation and lift off.

Figure 14:
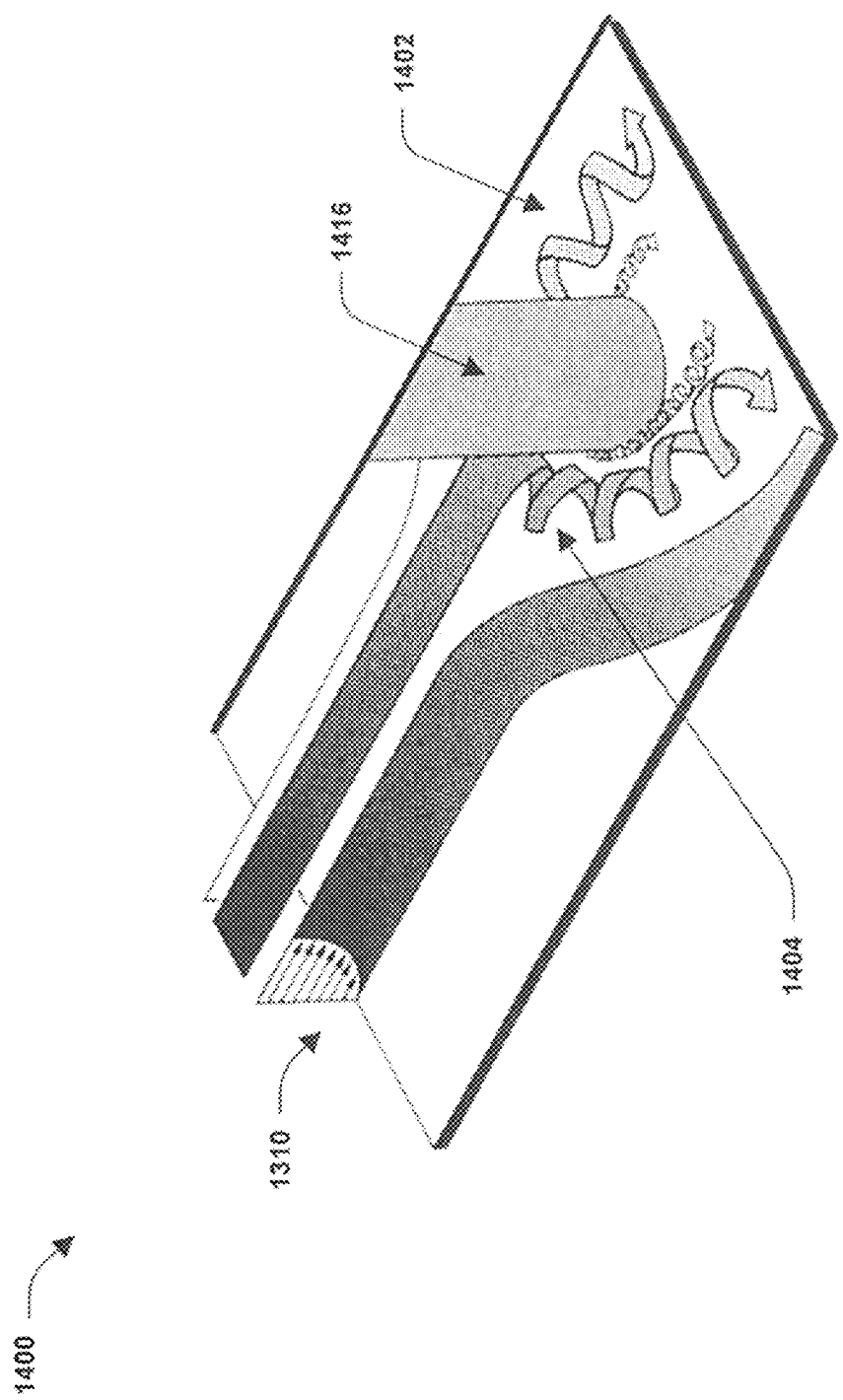
FIG. 14 is an illustration of example fluid flow associated with a horseshoe vortex, according to one or more embodiments.

FIG. 14 is an illustration of example fluid flow 1400 associated with a horseshoe vortex, according to one or more embodiments. A cooling jet, such as cooling jet 1416 may be viewed as an obstruction with respect to a free stream flow 1310 because the cooling jet 1416 is travelling in a substantially different direction than the free stream flow 1310. Because the cooling jet 1416 is treated as an obstruction, a horseshoe structure 1402 may be formed around the cooling jet 1416. As a result, energy loss may occur when kinetic energy travels backwards against a main flow or free stream flow 1310, as seen at an apex 1404 of the horseshoe structure 1402, for example. It will be appreciated that a shaped recess, such as shaped recess 1318 of FIG. 13, can be formed with respect to the cooling jet 1416 or an associated cooling channel to utilize the horseshoe structure 1402 to enhance film cooling.

Figure 15:
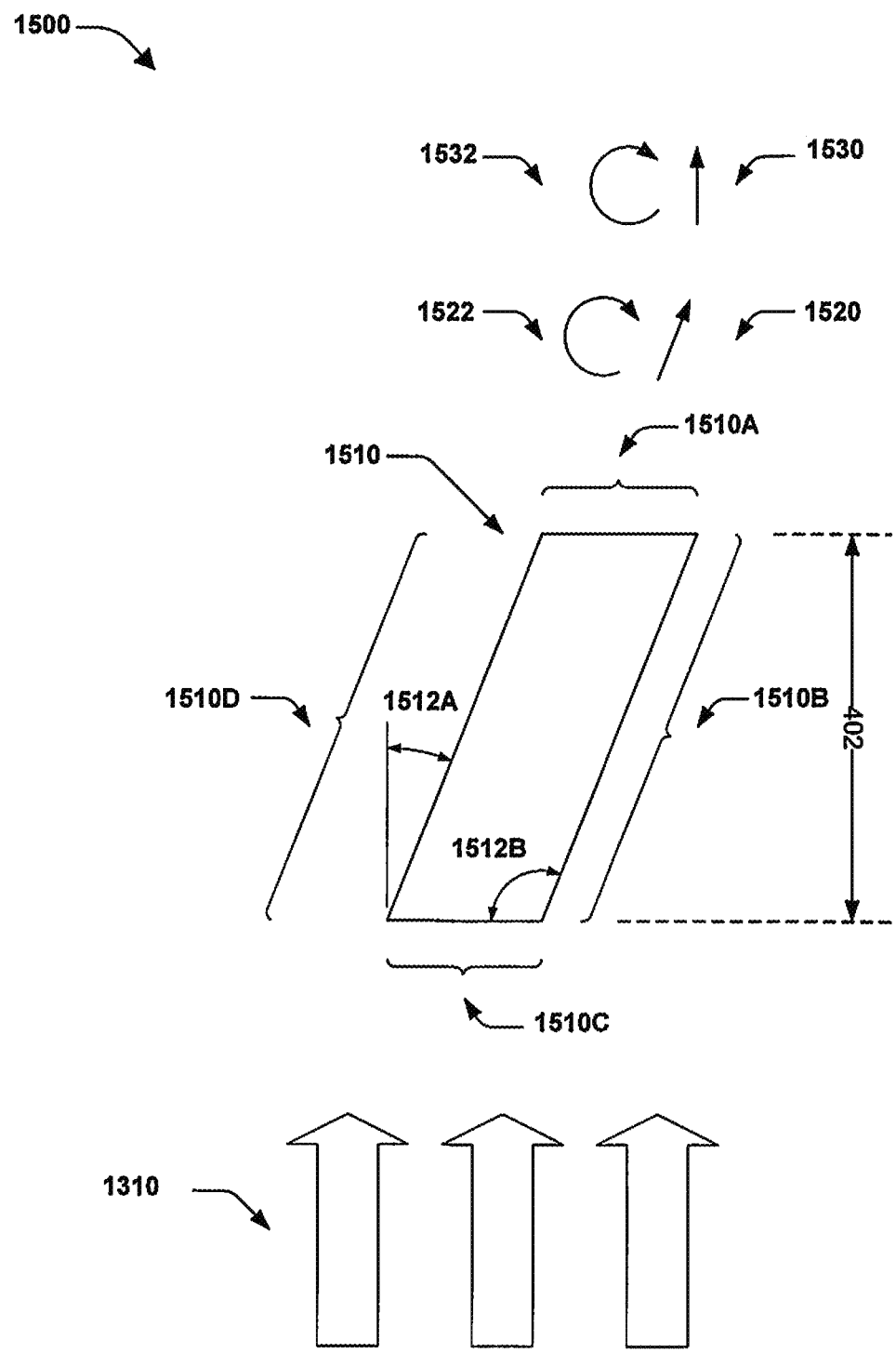
FIG. 15 is an illustration of a top-down view of an example shaped recess, according to one or more embodiments.

FIG. 15 is an illustration of a top-down view 1500 of an example shaped recess, according to one or more embodiments. The shaped recess 1510 or cavity of FIG. 15 can include one half, at least a portion of, or one leg of a "V" shape or a leg of a "V" shape. The shaped recess 1510 can be formed to be a variety of different shapes by adjusting one or more parameters associated with the shaped recess 1510. For example, one or more lengths, widths, depths, or angles associated with a shaped recess, such as recess 1510 can be adjusted to form different shaped recesses. The shaped recess 1510 of FIG. 15 has four sides or edges 1510A, 1510B, 1510C, and 1510D. However, it will be appreciated that other shapes or number of sides or edges are contemplated. The shaped recess 1510 can be formed with different lengths by adjusting 1510B and 1510D. Similarly, different widths can be formed by adjusting 1510A and 1510C.

Generally, it is desirable for the shaped recess 1510 to be long enough such that free stream flow 1310 views the shaped recess 1510 as an obstacle. Accordingly, a length 1502 or a length of 1510B and 1510D of the shaped recess 1510 can be adjusted based on an estimated velocity of the free stream flow 1310 or an estimated velocity of an associated boundary layer.

In one or more embodiments, the shaped recess 1510 can be formed at an angle 1512A to a direction of a free stream flow 1310. The angle 1512A of the recess 1510 with reference to the free stream flow 1310 can impact a direction of a vorticity field 1520 downstream from the shaped recess 1510. It can be seen that a direction of a vorticity field 1530 further downstream from 1520 is substantially aligned with the free stream flow 1310. In other words, a vortex associated with the shaped recess 1510 generally starts travelling in a direction aligned with a leg of a "V", but eventually straightens out downstream. Vortices 1522 can be seen to be travelling generally in direction 1520, while vortices 1532 generally travel in direction 1530. In one or more embodiments, the vortices 1522 and 1532 have a helical pattern and are associated with a frequency. In this way, one or more shaped recesses, such as the shaped recess 1510 of FIG. 15, are configured to create a vorticity field that substantially mitigates at least a portion of the counter rotating vortex pair 1510 of FIG. 15. In other words, at least a portion of an inverse vorticity field may be created to mitigate a vorticity field of a counter-rotating vortex pair, such as a kidney vortex generally inherent in the interaction between the coolant jets flowing from cooling channels and a cross flow of a free stream of heated fluid or gas flowing across a surface of an arrangement.

Additionally, one or more arrangements, pairings, or variations including a shaped recess and a structure, such as a cooling channel, may be formed. For example, a shaped recess can be formed or disposed upstream from, downstream from, or adjacent to a cooling channel, as described herein in FIG. 25. The shaped recess 1510 can thus enable a cooling jet from a cooling channel to form a film of coolant along a surface of an arrangement. In this way, a counter rotating vortex pair generally associated with an interaction between cross flow of a free stream gas and the cooling jet from the cooling channel can be substantially mitigated allowing cooling to better adhere to the surface of the arrangement. The shaped recess 1510 can also mitigate mixing of hot gases and coolant within a boundary layer, thereby improving film cooling efficiency such that $T_{surface}$ is closer to $T_{coolant}$.

A shaped recess, such as shaped recess 1510, can be configured to introduce turbulence into a boundary layer between a surface of a configuration and a free stream flow 1310. For example, a small amount of turbulence may help a boundary layer, such as a boundary layer injected with cool air from a cooling jet, to stick to a surface of an arrangement. In this way, a shaped recess can facilitate a transition from a laminar boundary layer to a turbulent boundary layer.

In one or more embodiments, a shaped recess, such as shaped recess 1510, can be configured to create one or more shedding effects. For example, the shaped recess 1510 can cause cavity shedding, wake shedding, shear layer shedding, or one or more other shedding modes, etc. In this way, shedding of vortices may occur at various frequencies, thereby energizing boundary layers and mitigating separation, for example.

A component, such as a turbine blade of a turbine airfoil can comprise a surface and the shaped recess 1510 of FIG. 15. The shaped recess 1510 can be within the surface of the component. The shaped recess 1510 can comprise one or more edges (e.g., 1510A, 1510B, 1510C, and 1510D) and a depth (not shown), and be at an angle 1512A to a direction of a free stream flow 1310.

Figure 16:
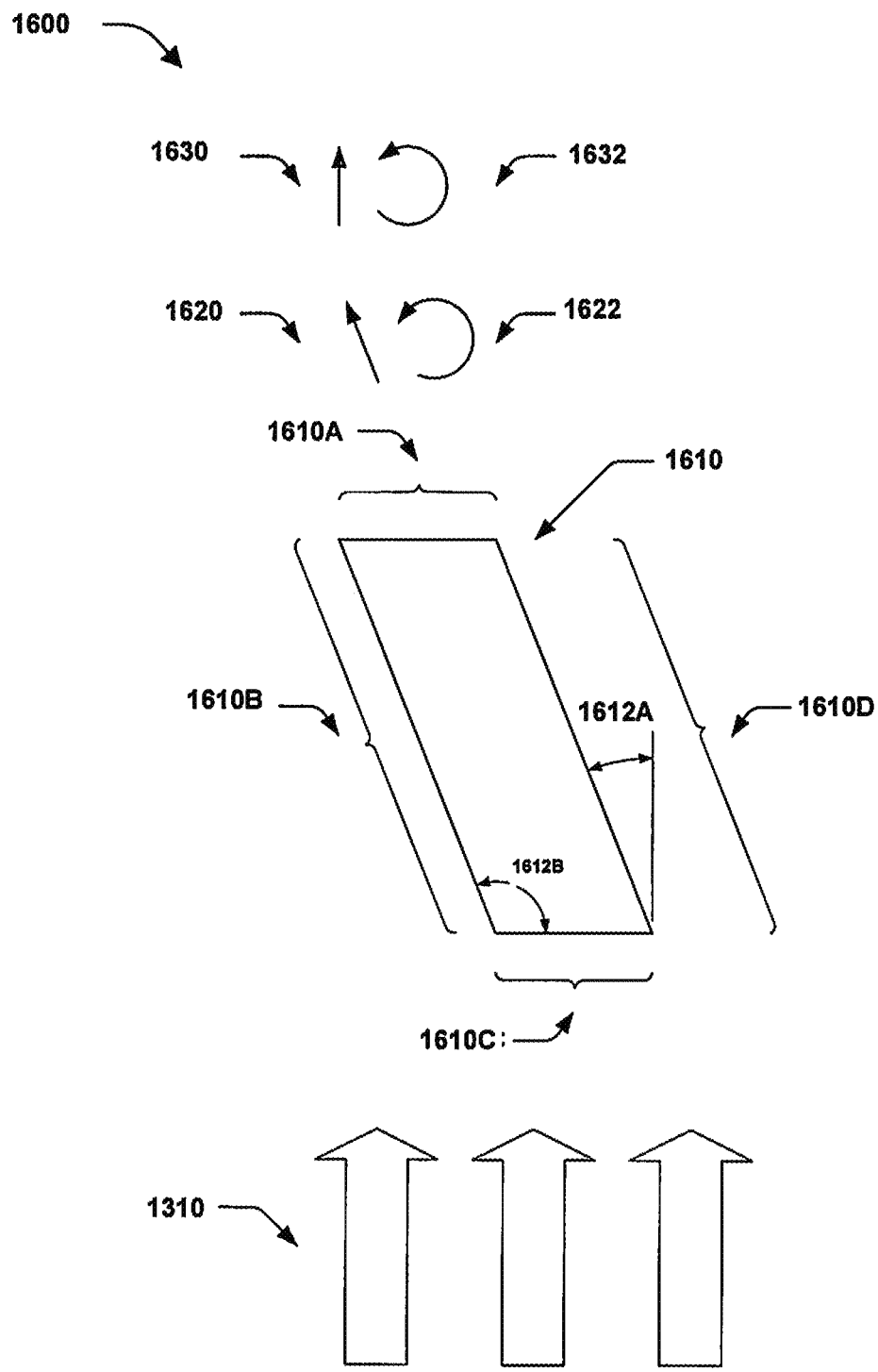
FIG. 16 is an illustration of a top-down view of an example shaped recess, according to one or more embodiments.

FIG. 16 is an illustration of a top-down view 1600 of an example shaped recess, according to one or more embodiments. It will be appreciated that FIG. 16 is similar to FIG. 15, except that the shaped recess 1610 of FIG. 16 is a mirror image of the shaped recess 1510 of FIG. 15. Accordingly, fluid effects for FIG. 16 are generally reversed with respect to FIG. 15. The shaped recess 1610 of FIG. 16 can include one half, a portion of, or one leg of a "V". For example, the shaped recess can have four sides and four corresponding lengths 1610A, 1610B, 1610C, and 1610D. The shaped recess 1610 can be formed at an angle 1612A to a free stream flow 1310. As a result of the free stream flow 1310 passing over the shaped recess 1610, a vortex 1622 may be formed that travels in direction 1620, eventually drifting along 1630, represented by vortex 1632.

Figure 17:
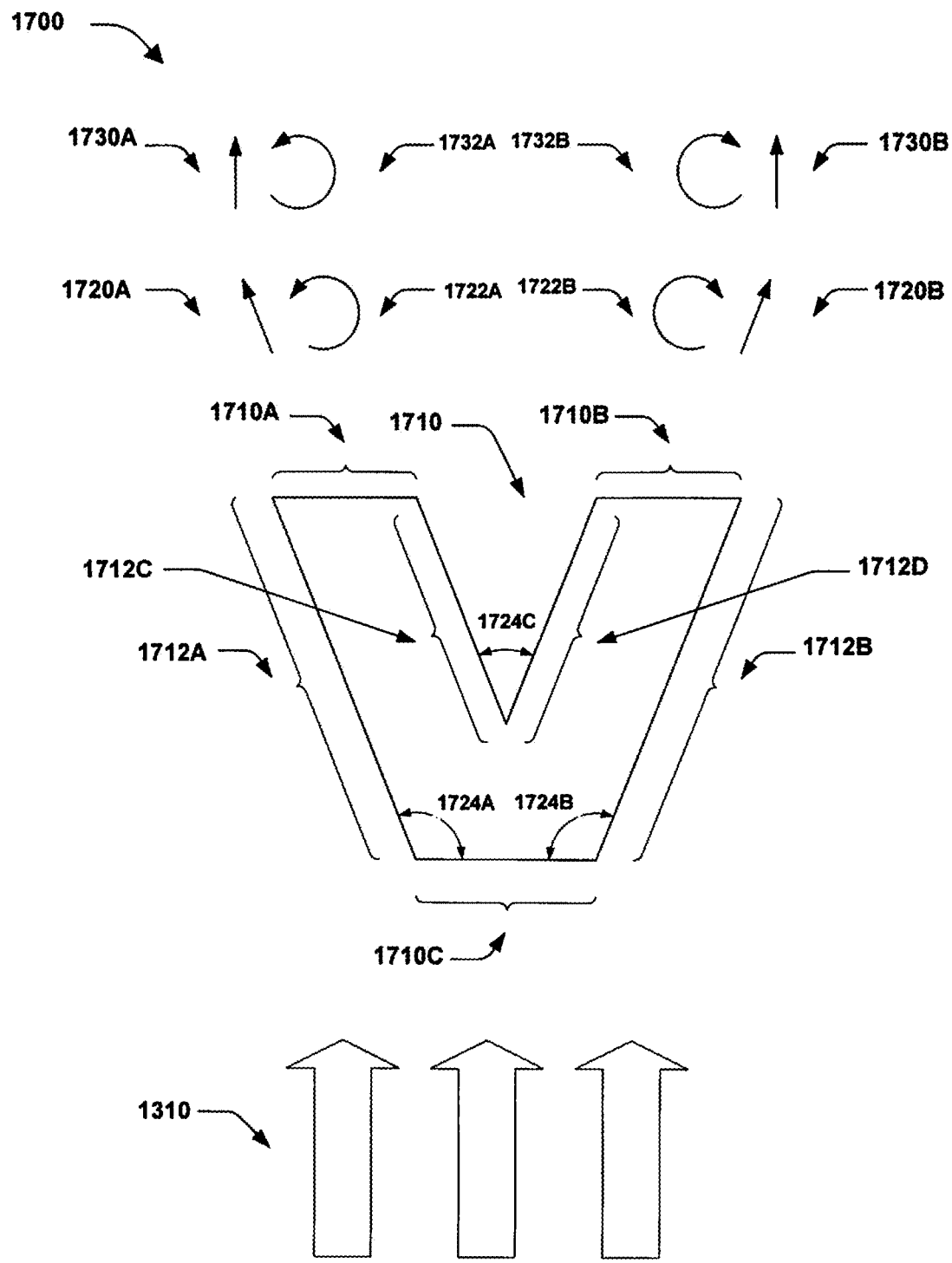
FIG. 17 is an illustration of a top-down view of an example shaped recess, according to one or more embodiments.

FIG. 17 is an illustration of a top-down view 1700 of an example shaped recess, according to one or more embodiments. The shaped recess 1710 of FIG. 17 can include a substantially "V" shaped recess or v-cess. In one or more embodiments, v-cess 1710 can be formed to have an interior angle 1724C. The v-cess 1710 can have one or more edges or lengths 1710A, 1710B, 1710C, 1712A, 1712B, 1712C, or 1712D. By adjusting the aforementioned lengths, angles 1724A, 1724B, and 1724C may be altered concurrently. It will be appreciated that the v-cess 1710 of FIG. 17 may be a combination of the shaped recess 1510 of FIG. 15 and the shaped recess 1610 of FIG. 16. Additionally, vortices 1722A, 1732A,17622B, and 1732B may follow 1720A, 1730A, 1720B, and 1730B. In other words, when the free stream flow 1310 passes over the v-cess 1710, a branch is formed at 1720A and a second branch is formed at 1720B. These two branches move downstream at 1730A and 1730B. In one or more embodiments, v-cess 1710 is configured such that free stream flow 1310 treats the v-cess 1710 as an obstacle or an obstruction. For example, the v-cess 1710 may be formed with a length, width, or depth, such that free stream flow 1310 or an associated boundary layer may be swallowed within a portion of the v-cess when passing over such a configuration.

In one or more embodiments, a shaped recess, such as v-cess 1710 causes a low temperature region between legs of the v-cess 1710 and high temperature regions downstream of the legs of the v-cess 1710. For example, this may be due to the vorticity setup by the v-cess 1710. Slower moving, low energy fluid from a cavity within the v-cess 1710 can be pulled on a surface between the legs of the v-cess 1710. As a result, an area away from the surface of the central region between the legs of the v-cess 1710 can contain a higher energy stream than steams above or upstream of the legs of the v-cess 1710.

Figure 18:
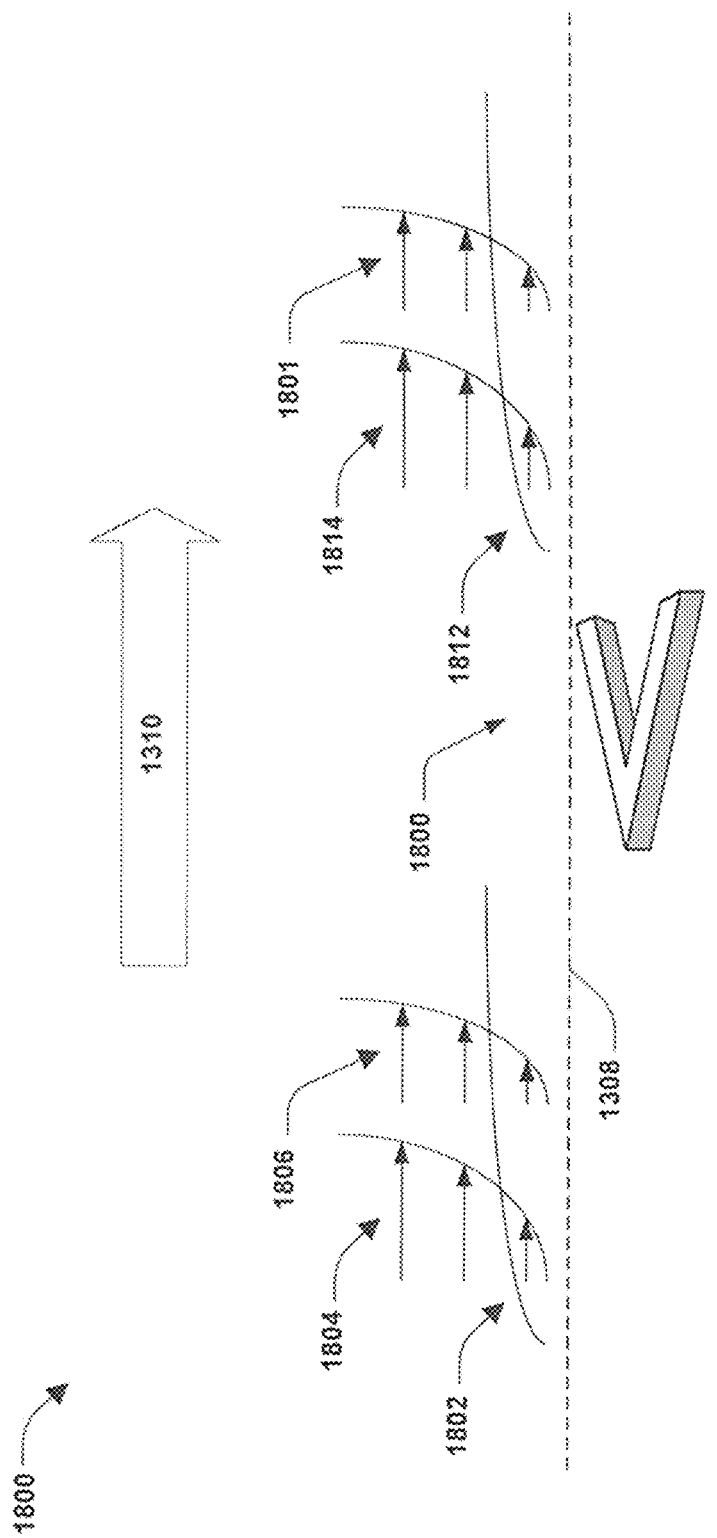
FIG. 18 is an illustration of an example height versus flow velocity diagram with relation to a "V" shaped recess (v-cess), according to one or more embodiments.

FIG. 18 is an illustration of an example height versus flow velocity diagram 1800 with relation to a "V" shaped recess (v-cess), according to one or more embodiments. In one or more embodiments, a shaped recess, such as the v-cess 1710 of FIG. 18, facilitates a restarting of a boundary layer, such as boundary layer 1812. For example, a first boundary layer 1802 is upstream from the v-cess 1710 and travelling substantially in the same direction as free stream flow 1310. As the first boundary layer 1802 continues downstream, it increases in thickness, and is associated with a decrease in a time-average velocity profile, such as from 1804 to 1806, for example. This means that the velocity at 1806 is less than the velocity at 1804 because a portion of the boundary layer 1802 'sticks' to the surface 1308.

The v-cess 1710 enables the boundary layer to restart at 1812 because a slow moving portion of the boundary layer 1802 closer to the surface 1308 may be swallowed by the v-cess 1710. This enables a faster moving portion of the boundary layer (e.g., as indicated by the top arrows of 1804 and 1806) to form boundary layer 1812.

Generally, when a faster moving flow sees structure, such as a vortex, cooling jet, recess, etc., the faster moving flow treats the structure as a 'bump'. In this scenario, the legs of the v-cess 1710 are treated as a bump such that a faster moving flow or free stream flow 1310 is funneled between or around the legs of the v-cess. For example, velocity downstream of v-cess 1710 and between legs of the v-cess 1710 can be increased. In other words, the v-cess 1710 may increase the velocity of boundary layer 1812, thereby decreasing a blowing ratio between the free stream flow 1310 and the boundary layer 1812. As a result of this decrease in the blowing ratio, an associated cooling jet is less likely to detach. Accordingly, a shaped recess can be used to split incoming flows from a free stream 1310 and a cooling jet, for example, into a high energy stream and a low energy stream, thereby mitigating lift off or separation of the cooling jet. In this scenario, the boundary layer 1812 is the low energy stream and the free stream 1310 is the high energy stream.

Figure 19:
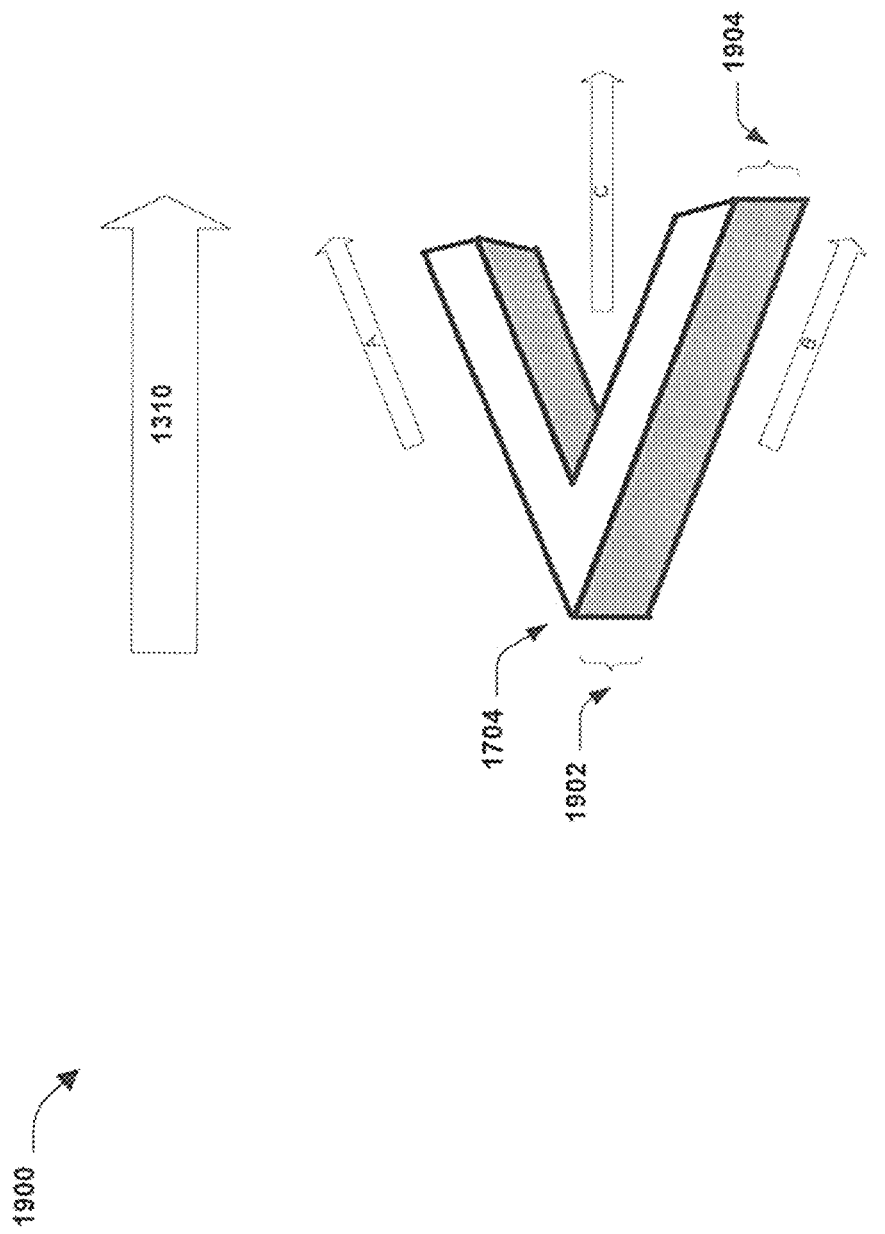
FIG. 19 is an illustration of a perspective view of an example "V" shaped recess (v-cess), according to one or more embodiments.

FIG. 19 is an illustration of a perspective view 1900 of an example "V" shaped recess (v-cess), according to one or more embodiments. A shaped recess, such as v-cess 1710 can be formed to have a first depth 1902 at a first portion of the v-cess 1710 and a second depth 1904 at a second portion of the v-cess 1710. In one or more embodiments, the length to depth ratio of a shaped recess is greater than 4:1 or 5:1. It may be advantageous to vary the depths 1902 and 1904 such that the shallower location is closer to a paired or coupled cooling channel (not shown). In other words, the depth of a shaped recess may not necessarily be uniform or may have some variation, for example. A shaped recess with the shallow location closer to a paired cooling channel would generally be less sensitive to an incoming boundary layer from upstream, for example.

Generally, it is desirable for at least a portion of a shaped recess to be deep enough such that a slow moving portion of flow, such as from a boundary layer, can be swallowed by the shaped recess as a free stream flow passes over the shaped recess. Accordingly, a portion of fluid may be swallowed by the v-cess 1910 as a free stream 1310 passes over the v-cess 1710. As a result, the v-cess 1710 is configured to restart a boundary layer downstream from the v-cess 1710, as described in FIG. 18. It will be appreciated that the swallowing or restarting associated with the boundary layer is based on one or more boundary layer characteristics, such as velocity of the boundary layer, a height of the boundary layer, or one or more shaped recess characteristics, such as a length, width, or depth of the shaped recess. One or more vortices may be formed as a result of a shaped recess, such as v-cess 1710, based on cavity flow.

Additionally, an angle of a wall of the shaped recess, such as 1902 or 1904, can be adjusted to create a desired effect, more turbulence, less turbulence, etc. Further, the depths

1902 and 1904 of a shaped recess can be adjusted such that the shaped recess may be or may not be a resonating cavity.

It will be appreciated that because legs of the v-cess 1710 may be treated as an obstacle by the free stream flow 1310, flows "A", "B", and "C" may be formed.

Figure 20:
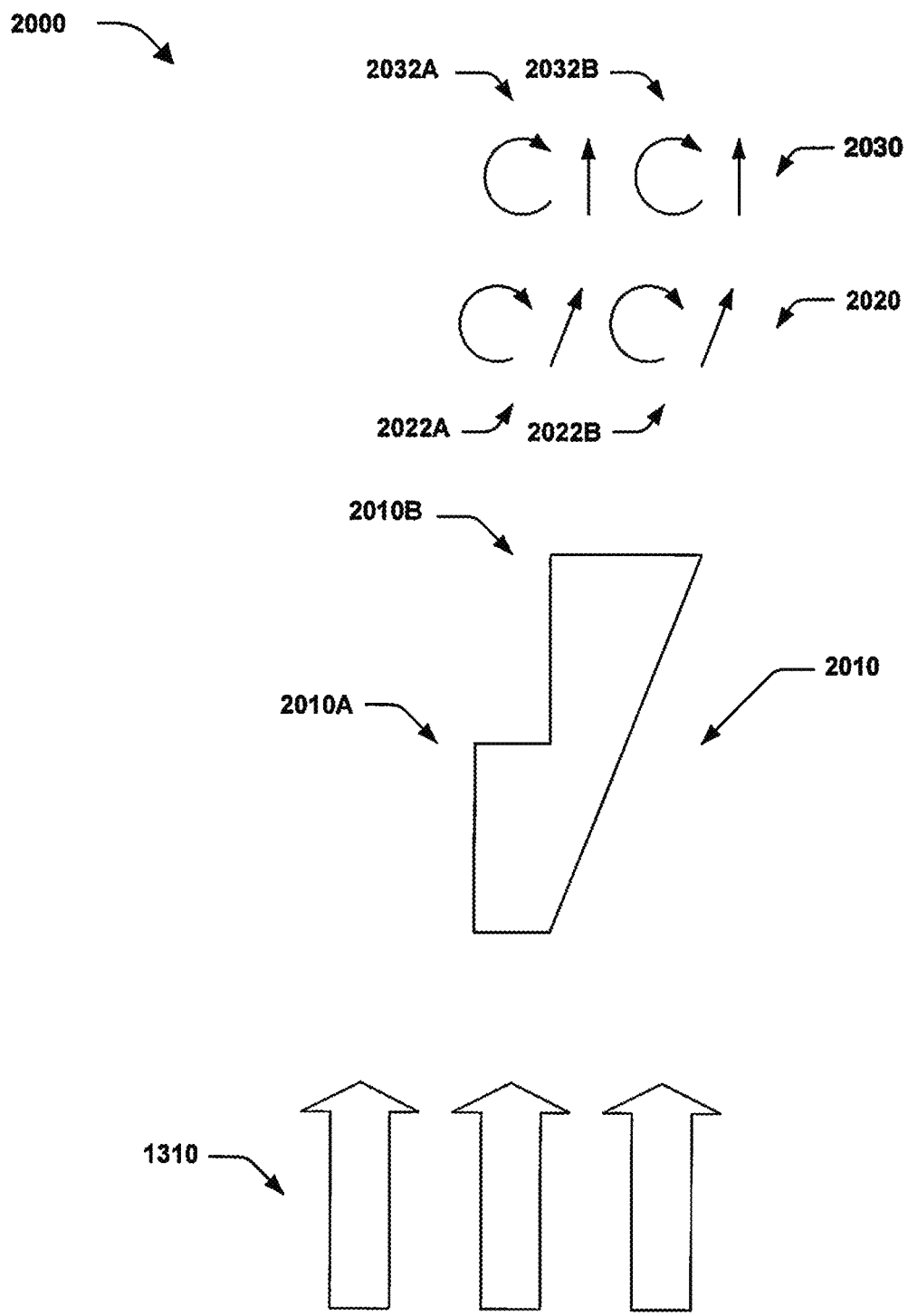
FIG. 20 is an illustration of a top-down view of an example shaped recess, according to one or more embodiments.

FIG. 20 is an illustration of a top-down view 2000 of an example shaped recess, according to one or more embodiments. The shaped recess 2010 of FIG. 20 can include one or more stages 2010A and 2010B or staggered regions, for example. According to one or more aspects, one or more of the stages 2010A and 2010B or one or more of the staggered regions can be linear, and include sharp corners. In other words, one or more of the stages of a shaped recess may be associated with a non-linear region, a rectangular region, a curved region, phases, stages, contours, etc. For example, respective corners or stages 2010A and 2010B may induce or create one or more corresponding vortex structures, such as 2022A and 2022B travelling along 2020. Downstream, 2032A and 2032B travel along 2030, rather than 2020. That is, one or more of the stages of the shaped recess configured to create a vorticity field downstream of the shaped recess.

Figure 21:
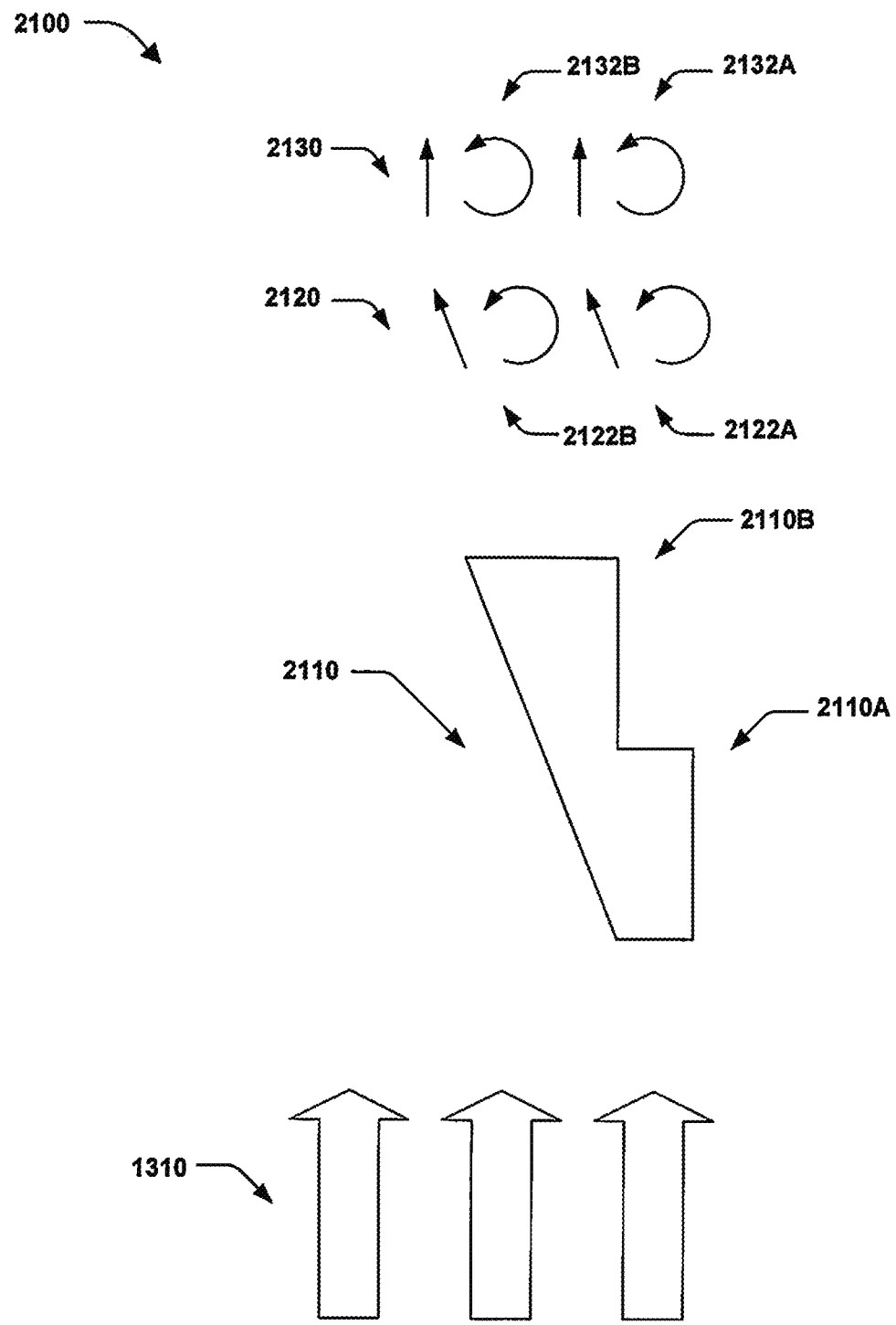
FIG. 21 is an illustration of a top-down view of an example shaped recess, according to one or more embodiments.

FIG. 21 is an illustration of a top-down view 2100 of an example shaped recess, according to one or more embodiments. The shaped recess 2110 of FIG. 21 can include one or more stages 2110A and 2110B or staggered regions, for example. It will be appreciated that FIG. 21 is similar to FIG. 20, except that the shaped recess 2110 of FIG. 21 is a mirror image of the shaped recess 2010 of FIG. 20. Accordingly, fluid effects for FIG. 21 are generally reversed with respect to FIG. 20.

Figure 22:
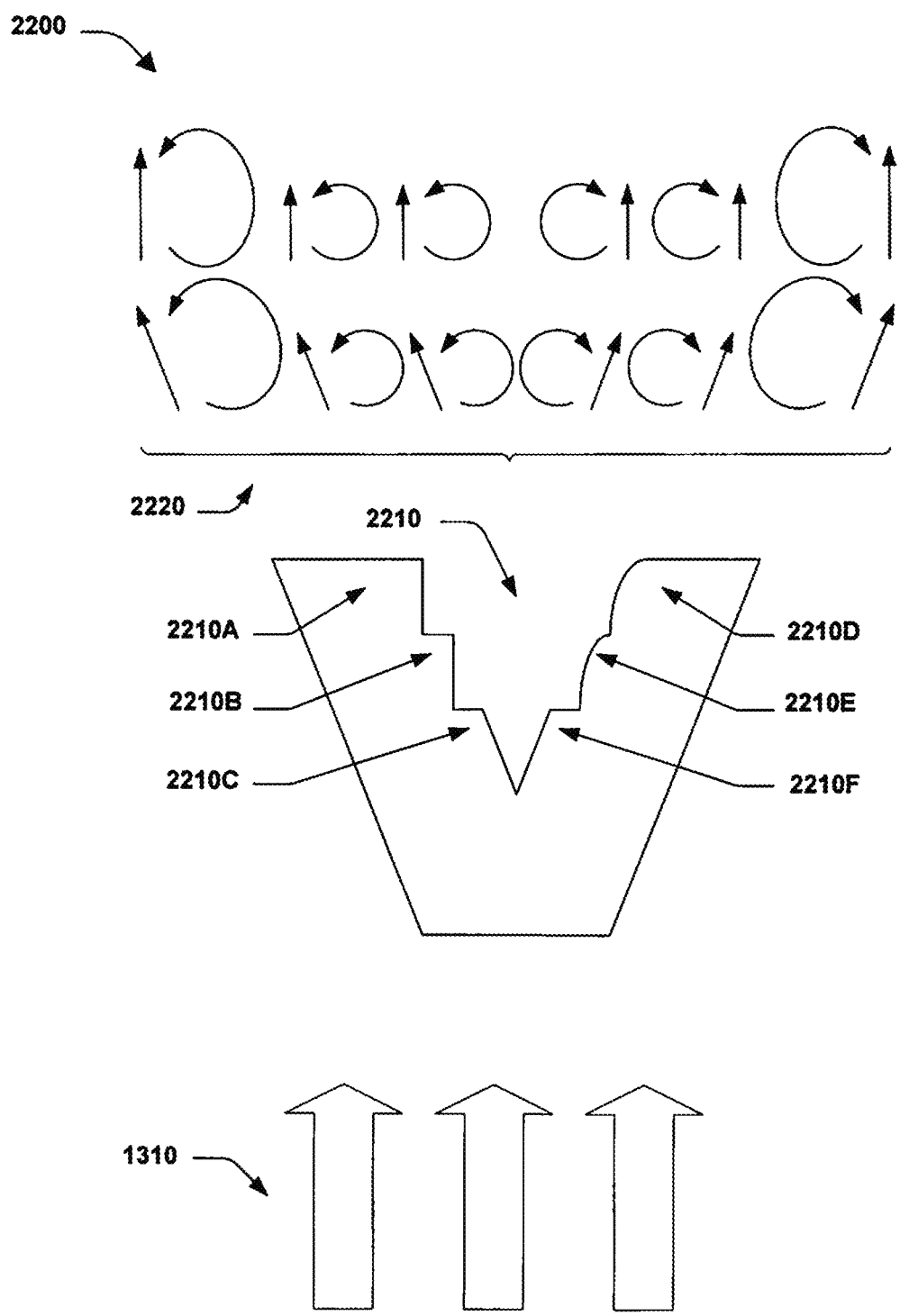
FIG. 22 is an illustration of a top-down view of an example shaped recess, according to one or more embodiments.

FIG. 22 is an illustration of a top-down view 2200 of an example shaped recess, according to one or more embodiments. The shaped recess 2210 of FIG. 22 can include one or more stages 2210A, 2210B, 2210C, 2210D, 2210E, and 2210F or staggered regions, steps, phases, etc., for example. According to one or more aspects, one or more of the stages, regions, phases, stages, contours, etc. 2210A, 2200B, and 2200C or one or more of the staggered regions can be linear. According to one or more aspects, one or more of the stages 2210D, 2200E, and 2200F can be non-linear, rounded, arced, etc. It will be appreciated that a leg of a v-cess or shaped recess may be configured to have a combination of linear and non-linear steps, regions, phases, stages, contours, etc., such as in an alternating pattern (e.g., squared-rounded-squared-rounded, etc.). As a result of one or more of the stages 2210A, 2210B, 2210C, 2210D, 2210E, or 2210F vorticity field 2220 may be formed.

Figure 23:
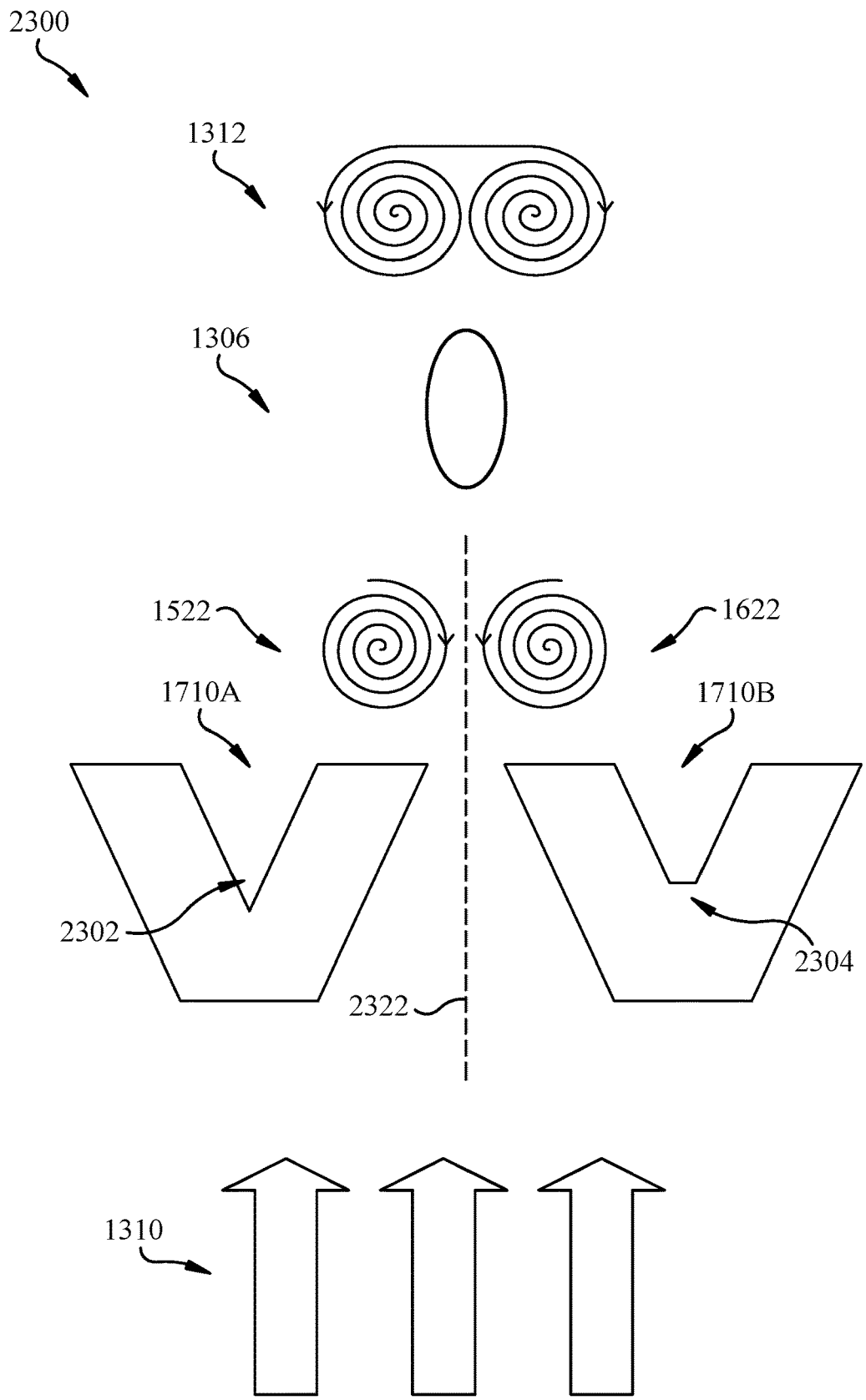
FIG. 23 is an illustration of a top-down view of one or more example shaped recesses upstream of a cooling channel, according to one or more embodiments.

FIG. 23 is an illustration of a top-down view 2300 of one or more example shaped recesses upstream of a cooling channel, according to one or more embodiments. One or more shaped recesses can be used to draw cool air from a cooling jet of a cooling channel upstream. For example, a first v-cess 1710A and a second v-cess 1710B can be formed upstream from a cooling channel 1306. The first v-cess 1710A has a sharp angle 2302 at the interior of the "V", while the second v-cess 1710B has a flat edge 2304 at the interior of the "V". It will be appreciated that a v-cess can have a variety of shapes. For example, a v-cess can have a rounded, curved, tapered, staggered, etc. edge at the interior of the "V".

In one or more embodiments, two v-cesses are paired or coupled with a cooling channel 1306. For example, a right leg of a first v-cess and a left leg of a second v-cess can be centered with a free stream flow 1310 and the cooling channel. In other words, a shaped recess can be formed based on a set of x-coordinates or a set of y-coordinates relative to one or more additional shaped recesses, one or more cooling channels, etc. In this scenario, the first v-cess 1710A and the second v-cess 1710B are aligned such that vortices 1622 and 1622 stack with counter-rotating vortex pair 1312 or a kidney vortex associated with cooling channel 1306.

Additionally, one or more shaped recesses can be arranged in a row, column, etc. For example, the shaped recesses may be arranged in a row with respect to a direction of a free stream flow 1310. Here, the first v-cess 1710A and the second v-cess 1710B are arranged in a row relative to a direction of a free stream flow 1310. In this configuration, the first v-cess 1710A and the second v-cess 1710B can be placed upstream from the cooling channel 1306 to mitigate a counter rotating vortex pair 1312 associated with the cooling channel 1306, thereby keeping a cooling jet (not shown) of the cooling channel 1306 attached to a surface of an associated configuration. For example, the first v-cess 1710A is configured to generate a first inverse counter rotating vortex 1522. The second v-cess 1710B is configured to generate a second inverse counter rotating vortex 1622. Together, the first inverse counter rotating vortex 1522 and the second inverse counter rotating vortex form an inverse counter rotating vortex pair that substantially cancels out the counter rotating vortex pair 1312. In this way, film cooling can be enhanced, because the inverse counter rotating vortex pair forces the coolant jet down, keeping it 'stuck' to the surface. As a result of the coolant jet staying low to the surface, film cooling efficiency can be enhanced.

In one or more embodiments, the cooling channel 1306 may be substantially centered along a centerline 2322 between the first v-cess 1710A and the second v-cess 1710B. Because the first v-cess 1710A and the second v-cess 1710B can be configured to introduce turbulence into a boundary layer of the free stream flow, the counter rotating vortex pair 1312 associated with the cooling channel 1306 can be mitigated. For example, the first v-cess 1710A and the second v-cess 1710B can be configured to create an inverse counter rotating vortex pair from 1522 and 1622 based on a location of the first v-cess 1710A and a location of the second v-cess 1710B relative to a location of the cooling channel 1306.

In FIG. 23, a first v-cess 1710A and a second v-cess 1710B are coupled with the cooling channel 1306. Although illustrated with different interiors at 2302 and 2304, it will be appreciated that a first v-cess and a second v-cess in this type of configuration may have the same shape interior, such as both having a sharp angle 2302 or both having a flat edge 2304. Additionally, the first v-cess 1710A and the second v-cess 1710B may be associated with corresponding interior angles.

Figure 24:
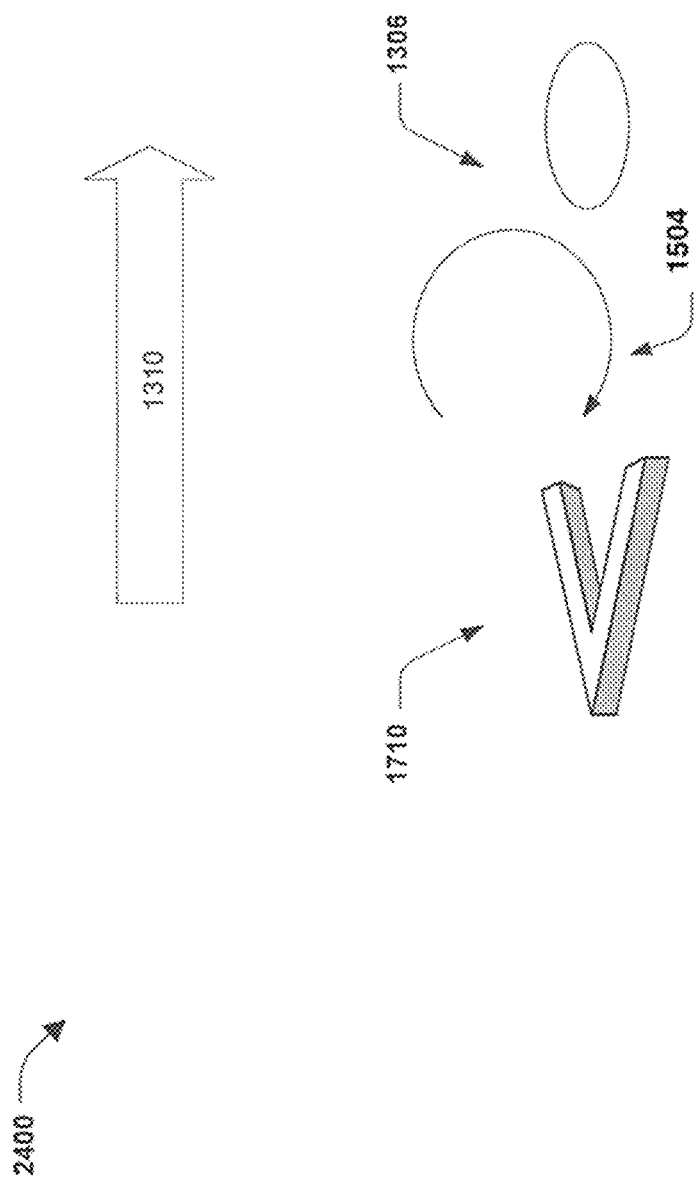
FIG. 24 is an illustration of example fluid flow associated with a "V" shaped recess (v-cess) drawing coolant upstream from a cooling channel, according to one or more embodiments.

FIG. 24 is an illustration of example fluid flow 2400 associated with a "V" shaped recess (v-cess) drawing coolant upstream from a cooling channel, according to one or more embodiments. As a result of a horseshoe structure 1504 or vortex in combination with fluid effects of a shaped recess, such as a v-cess 1710, cool air can be drawn upstream from a cooling channel 1306. For example, high pressure associated with a horseshoe structure 1504 can push a portion of flow backwards or upstream, even when the cooling channel 1306 is angled away from the shaped recess or v-cess 1710. Accordingly, a shaped recess, such as a v-cess 1710, may be configured to draw coolant from a cooling channel 1306 upstream.

Figure 25:
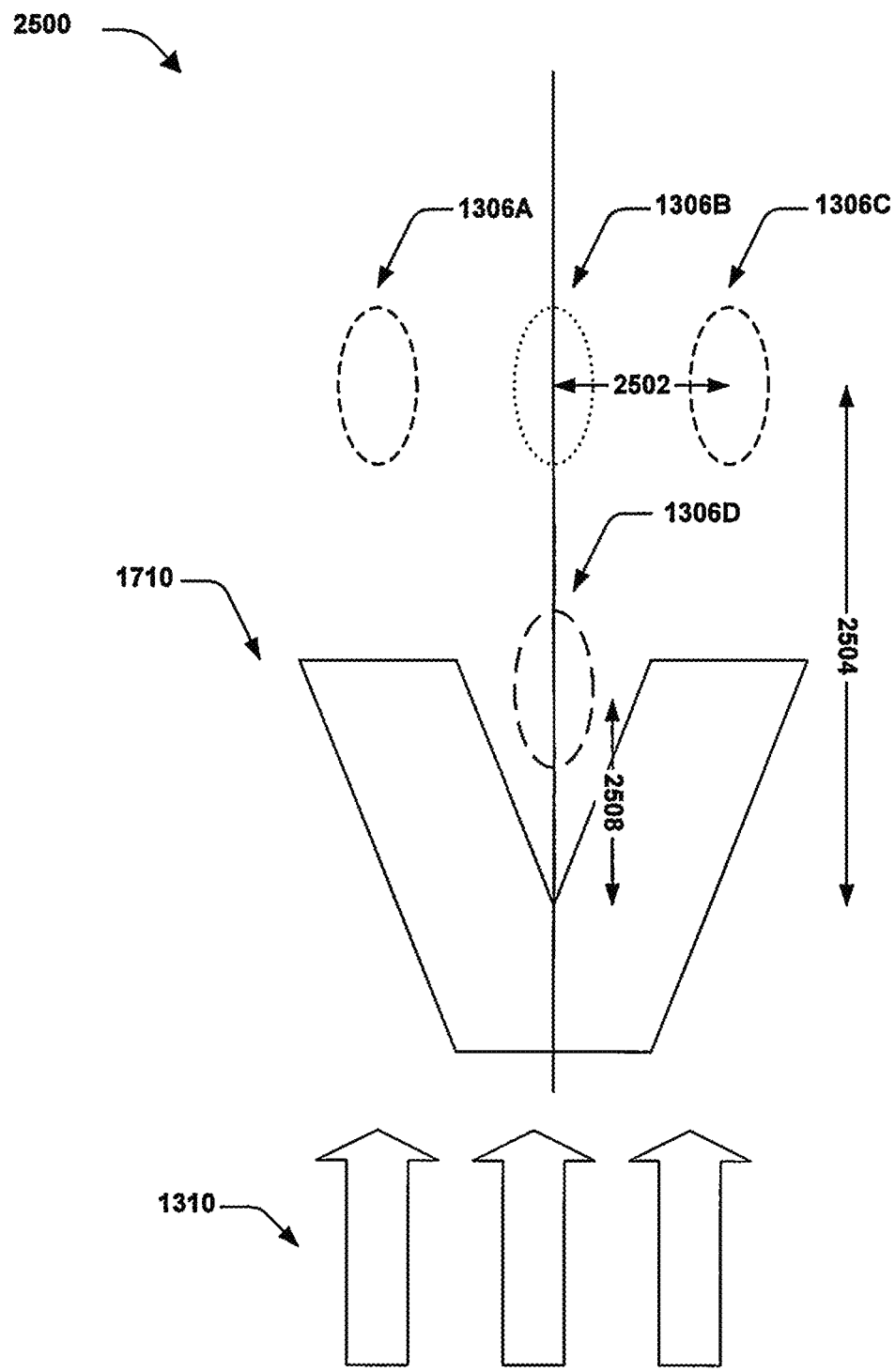
FIG. 25 is an illustration of a top-down view of an example shaped recess upstream from one or more cooling channels, according to one or more embodiments.
Figure 26:
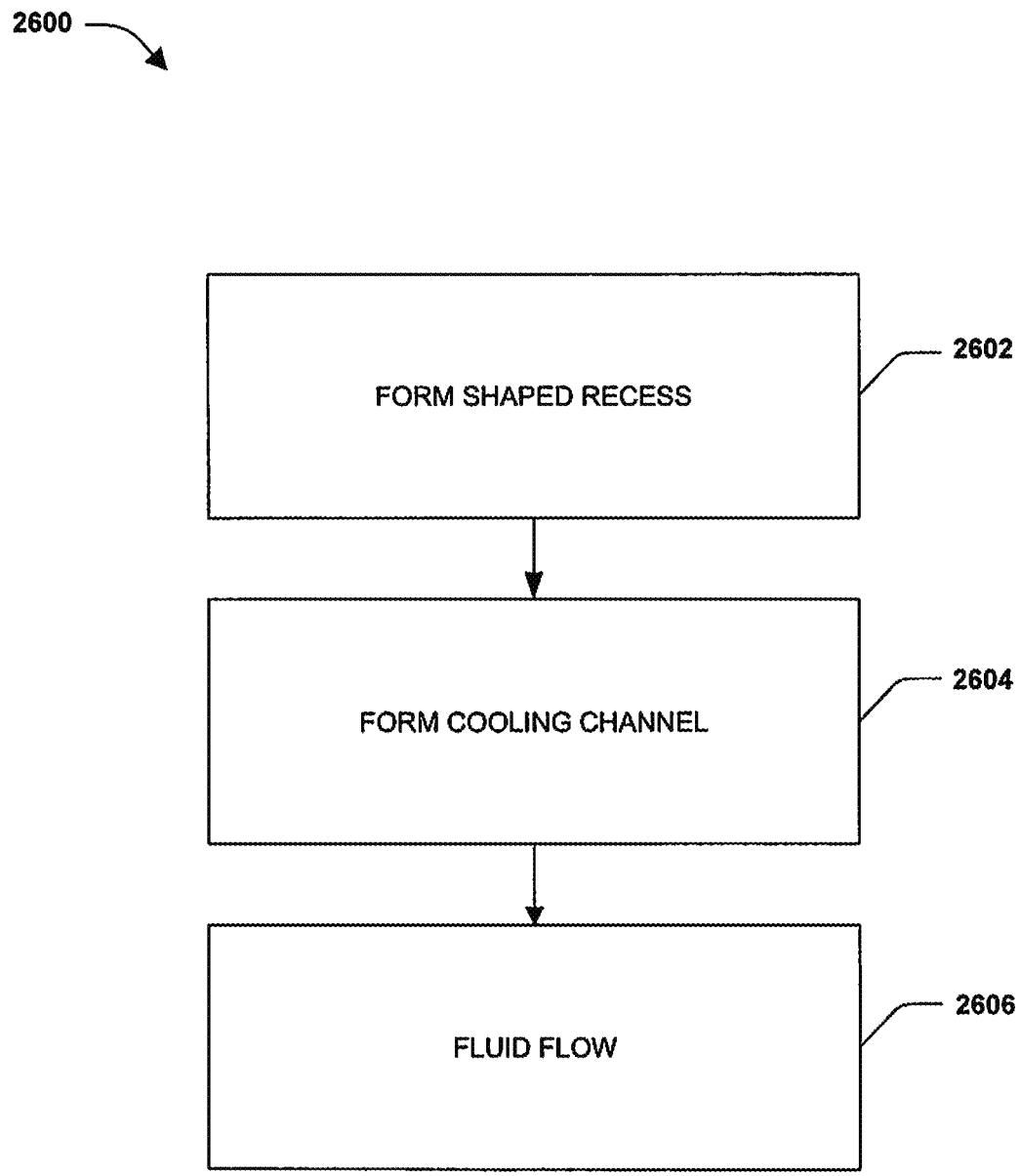
FIG. 26 is an illustration of an example flow diagram of a method for shaped recess flow control, according to one or more embodiments.

FIG. 25 is an illustration of a top-down view 2500 of an example shaped recess upstream from one or more cooling channels, according to one or more embodiments. A shaped recess, cooling channel, or other structure can be formed relative to another shaped recess, cooling channel, or structure. For example, a Cartesian coordinate system may be used to indicate an amount of offset one structure has with respect to another. One or more shaped recesses can be aligned with one or more cooling channels. For example, an apex of a v-cess may be aligned with a cooling channel, as seen with v-cess 1710 and cooling channels 1306B and 1306D, offset by distances 2508 or 2504 from the apex. In one or more embodiments, a leg of a v-cess may be aligned with a cooling channel, as seen with v-cess 1710 and cooling channels 1306A and 1306C, offset by 2502 from a centerline and 2504 from the apex of the "V" of the v-cess 1710, for example. In other words, the cooling channel 1306 may be offset by an x-coordinate from the v-cess 1710 and a y-coordinate from the v-cess 1710. Stated yet another way, a position of a cooling channel relative to a position of a shaped recess can be variable. For example, there may be an intersection of a cooling hole or cooling channel with a shaped recess or v-cess.

In one or more embodiments, a shaped recess, such as v-cess 1710, can be formed upstream from a cooling channel, such as cooling channel 1306A, 1306B, 1306C, or 1306D. In other embodiments, the shaped recess can be formed downstream from the cooling channel.

In one or more embodiments, stagnation pressure adjacent to a cooling channel, such as cooling channel 1306, is lower than surrounding stagnation pressure. This pressure differential enables coolant to spread laterally, for example. In other words, a v-cess 1710 or shaped recess can decrease fluid velocity adjacent to a cooling channel, thereby inviting a corresponding or associated cooling jet to spread out.

FIG. 15 is an illustration of an example flow diagram of a method 2600 for shaped recess flow control, according to one or more embodiments. In one or more embodiments, a shaped recess can be formed at 2602. The shaped recess can be a portion of a v-shaped recess or v-cess. A cooling channel can be formed at 2604, such that the cooling channel and the shaped recess are offset by a certain distance (e.g. offset by an x-coordinate and 26y-coordinate). At 1506, fluid flow may commence such that there is an interaction between the shaped recess and the cooling channel.

It will be appreciated that a shaped recess can be used for flow control applications other than turbine airfoil applications, such as high pressure turbine vanes, rotor blades, and combustion liners, etc. For example, shaped recesses can be used for supersonic inlets, shock control, boundary layer control, on rotor tips, or for passive flow control applications. Additionally, a shaped recess can be used in a flow control application to energize a boundary layer, to setup counter rotating vortices, or to split an incoming flow into a high energy stream and a low energy stream close to a surface. In this way, a shaped recess can enable increased turbine inlet temperatures and improve engine cycle performance, while mitigating cost.

In one or more embodiments, a component is provided comprising a surface and a shaped recess within the surface of the component, wherein the shaped recess comprises one or more edges and a depth, wherein the shaped recess is at an angle to a direction of a free stream flow. A shape of the shaped recess can comprise at least a portion of a leg of a V shape. The shaped recess can be configured to introduce turbulence into a boundary layer of the free stream flow. The component can comprise one or more additional shaped recess arranged in a row with respect to the direction of the free stream flow. A shape of the shaped recess can comprise a V shape and the V shape may be associated with an interior angle. It will be appreciated that the shaped recess may not necessarily be four sided. For example, the shaped recess can be triangular, etc.

In one or more embodiments, a component, such as an turbine blade of a turbine airfoil can comprise a surface, a shaped recess within the surface of the component, wherein the shaped recess comprises one or more edges and a depth, wherein the shaped recess is at an angle to a direction of a free stream flow, and a cooling channel within the surface of the component, wherein the cooling channel is offset by an x-coordinate from the shaped recess and a y-coordinate from the shaped recess. The shaped recess can comprise one or more stages. For example, one or more of the stages of the shaped recess can be associated with a non-linear region or a rectangular region, etc. Additionally, one or more of the stages of the shaped recess configured to create a vorticity field downstream of the shaped recess. The shaped recess can be configured to draw coolant from the cooling channel upstream.

In one or more embodiments, a component is provided, comprising a surface, a first V shaped recess (v-cess) within the surface of the component, wherein the first v-cess comprises one or more edges and a depth, a second v-cess within the surface of the component, wherein the second v-cess comprises one or more edges and a depth, the first v-cess and the second v-cess arranged in a row relative to a direction of a free stream flow, and a cooling channel within the surface of the component, the cooling channel upstream from the row of v-cesses. The cooling channel can be substantially centered along a centerline between the first v-cess and the second v-cess. The first v-cess and the second v-cess can be configured to introduce turbulence into a boundary layer of the free stream flow. The first v-cess and the second v-cess can be associated with corresponding interior angles, comprises one or more stages, and be associated with a non-linear region or a rectangular region, etc. The first v-cess and the second v-cess can be configured to create an inverse counter rotating vortex pair.

In some embodiments, the innovative cooling apertures incorporating the innovative cooling channels can mitigate separation of the cooling jet stream caused by the counter rotating vortex pair. For example, the innovative cooling aperture can be configured to introduce one or more fluid effects, one or more temperature effects, or one or more shedding effects that enhance film cooling effectiveness.

In one or more embodiments, the innovative cooling aperture can enhance film cooling effectiveness by introducing a small amount of turbulence that mitigates separation of the cooling jet stream from the surface, thereby keeping the cooling jet stream attached to the surface.

Further, in other embodiments, the innovative cooling aperture can use less cooling air from the compressor or simply less cooling apertures, then more air can be used through the combustor and turbine, thus increasing engine efficiency.

In one aspect of the innovation, the cooling apertures may be configured to inject cooling air against the flow of the free stream air.

Figure 30:
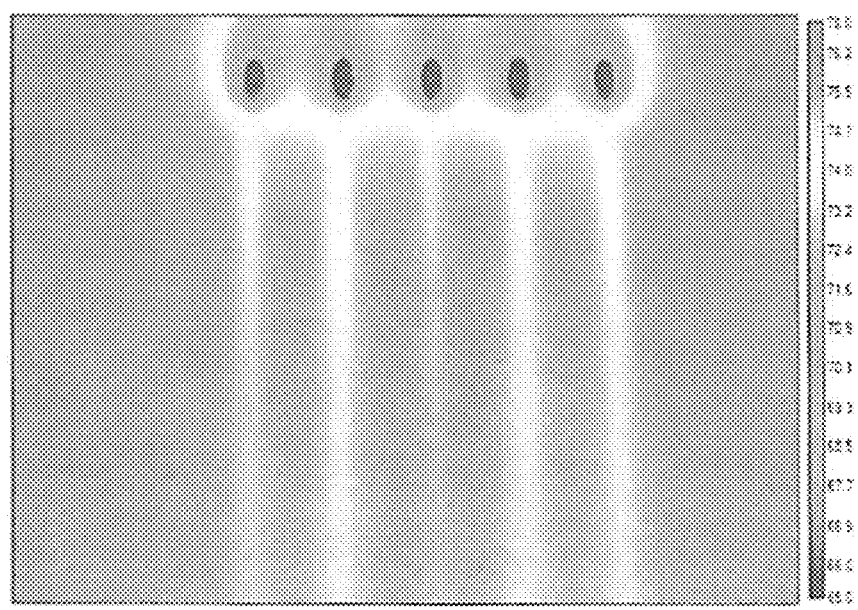
FIG. 30 is a thermal graph depicting the temperature gradient of a comparison embodiment.

Conventionally, cooling holes on gas turbine blades are angled in such a way as to align them as much as possible with the hot gas flow direction. This is to minimize interaction losses. In this configuration, the flow emanating from the cooling hole interacts with the crossflow (also known as free stream or hot gas flow) to create kidney shaped vortices that bring hot gas down onto the surface. This can diminish cooling effectiveness. At high blowing ratios (approximately 2.0 and higher), the cooling jets tend to lift off and the thermal map on the blade surface is streaky as shown in FIG. 30. Excess cooling is used to compensate for this. Thus, there is a need to uniformly cool gas turbine hot sections, including at high blowing ratios. In addition, ceramic matrix composites are being used in gas turbine hot sections, thus increasing the need to uniformly cool the hot section surfaces with as little coolant as possible to maximize thermal efficiency.

According to an aspect of the innovation, providing cooling apertures (e.g., holes) that face the hot gas stream (e.g., are angled to produce cool air that does not align with the hot gas flow direction), greatly increases cooling effectiveness and uniformity. This results in the ability to space holes further apart to reduce mechanical stresses and in more uniform thermal maps that reduce thermal stresses. It is possible to couple this 'reverse' blowing with an upstream or downstream step to further increase effectiveness and uniformity. Cooling hole shapes with spirals or flares or fluidic reverse blowing may also be considered.

Conventionally, cooling holes are short (length to diameter ratio, L/D<6) and thus the experiments conducted using IR thermography used flat plate coupons with length to diameter ratios of 2-6. Tests were conducted in the low speed SW-6 wind tunnel at NASA's Glenn Research Center at engine relevant Reynolds number, for a range of blowing ratios (0.5-3) and for various arrangements of revere blowing. Reverse blowing may enable more widely spaced holes that are also a benefit to reducing stresses for ceramic matrix composite airfoils or liners that require film cooling.

Figure 27:
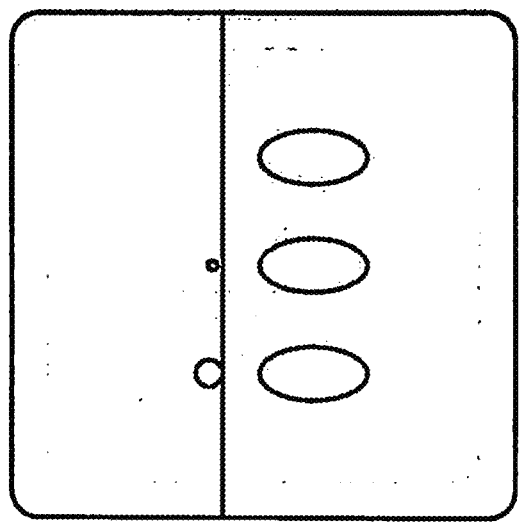
FIG. 27 is an illustration of a top down design according to an embodiment of the innovation.

FIG. 27 is a top down illustration of a cooling aperture configuration according to an embodiment of the innovation.

Figure 28:
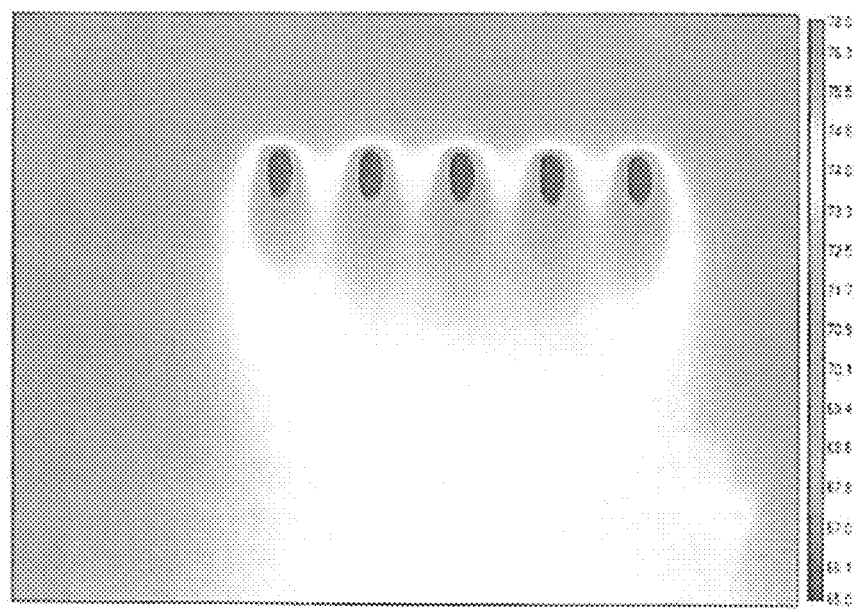
FIG. 28 is a thermal graph depicting the temperature gradient of an example embodiment according to the innovation.
Figure 29:
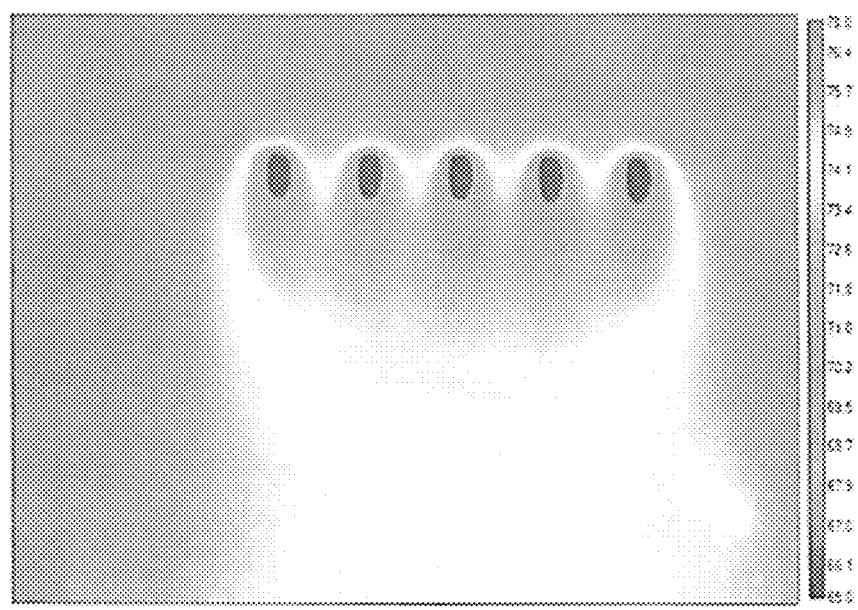
FIG. 29 is a thermal graph depicting the temperature gradient of an example embodiment according to the innovation.

FIGS. 28, 29, and 30 are thermal graphs illustrating the temperature gradient according to example embodiments of the innovation (FIGS. 28 and 29) compared to a traditional configuration (FIG. 30) in which the cooling holes direct coolant air to align with the flow of the free stream air. In all three figures, the holes are depicted in dark blue. In FIGS. 28 and 29, the cooling holes direct the coolant air in a direction that is opposite of the direction of the flow of free stream air. In FIG. 30, the cooling holes direct the coolant air in a direction that aligns with the flow of the free stream air.

In some embodiments, the reverse blowing ratio is 1.0 or less. For example, FIG. 28 depicts the thermal gradient that resulted from a reverse blowing ration of 1.0. As can be seen in FIG. 28, this configuration resulted in superior cooling as compared to the configuration depicted in FIG. 30.

In other embodiments, the system and method may be used with high blowing ratios of 2.0 or greater. For example, FIG. 29 depicts the thermal gradient that resulted from a blowing ratio of 2.0. As can be seen, in FIG. 29, this configuration resulted in superior cooling as compared to the configurations in FIGS. 28 and 30.

Figure 31:
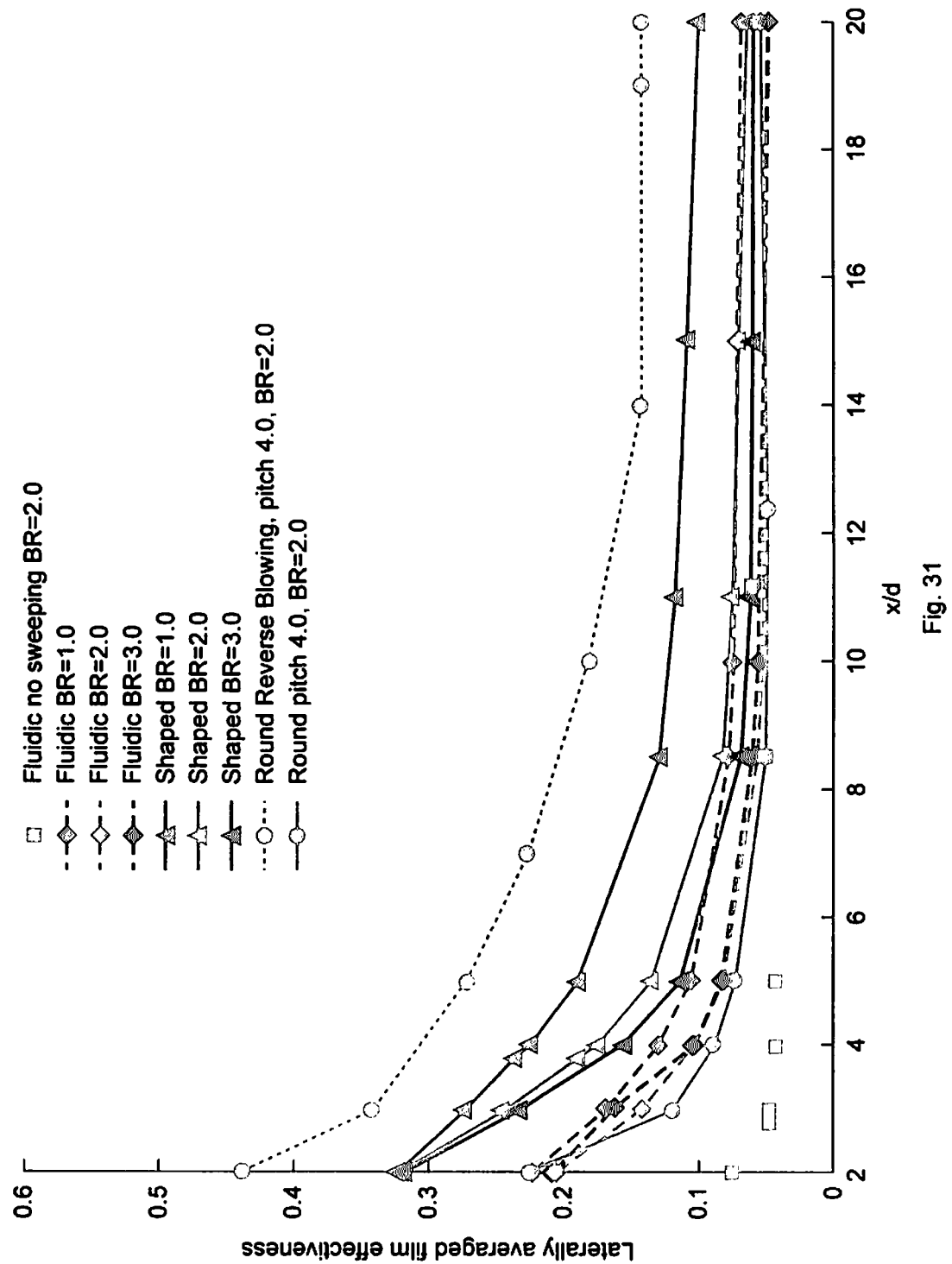
FIG. 31 is a graph illustrating the film effectiveness of various examples, including example embodiments according to the innovation

FIG. 31 is a graph illustrating the film effectiveness of various configurations of cooling apertures. As shown, the configuration utilizing reverse blowing had the best film effectiveness. The remaining configurations utilized configurations in which coolant air flowed in alignment with the free stream air. As described herein, there are various ways to configure the cooling apertures (e.g., spiral-, flare- or fluidic-shaped) that, when combined with the reverse blowing according to the innovation, may improve film effectiveness.

Figures 32A, 32B, 32C:
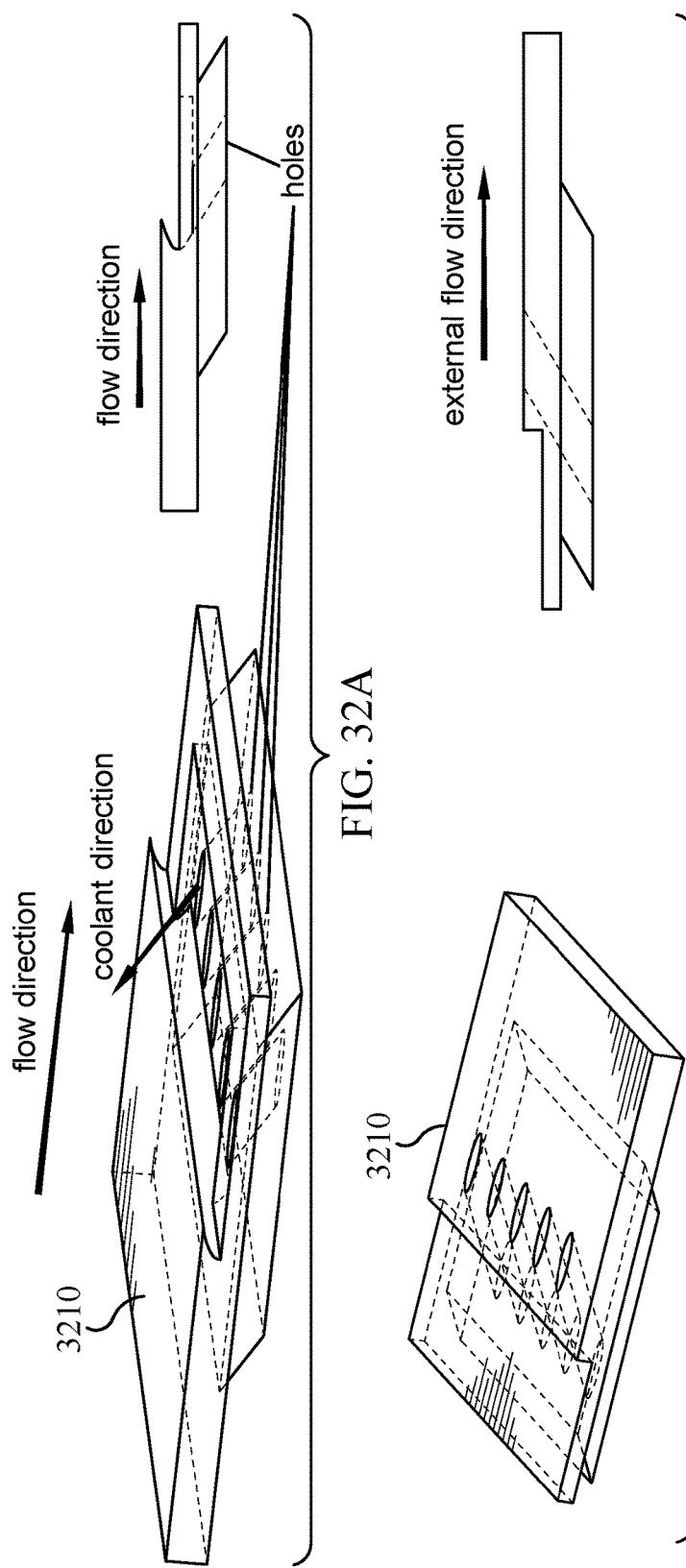
FIGS. 32A-32C are illustrations depicting various configurations of cooling apertures according to the innovation.

FIGS. 32A-32C are illustrations depicting various configurations of cooling apertures. The surface to cool 3210 may include a surface of a turbine blade. FIGS. 32A and 32C depict configurations in which a cooling aperture provides coolant that flows opposite of the external flow direction. In one embodiment, the apertures may be located downstream of the external flow. In one embodiment, the cooling holes may be spaced a pitch to diameter ratio apart from each other. In one embodiment, the cooling holes may be spaced at a ratio of about 3 to 6. In one embodiment, the hole length may be relatively short (i.e., less than 6 hole diameters long). FIG. 32B depicts a configuration in which the cooling aperture provides coolant that flows in alignment with the external flow direction.

In one embodiment, the cooling aperture (e.g., cooling hole) may be oriented to an external surface of the turbine blade. The angle may be in the range of about 15° to about 60°, about 20° to about 50°, or about 25° to about 45°. In one embodiment, the angle may be about 15°, 20°, 25°, 30°, 35°, 40°, or 45°. In another embodiment, the cooling aperture may be oriented parallel with an external surface of the turbine blade.

What has been described above includes examples of the innovation. It is, of course, not possible to describe every conceivable combination of components or methodologies for purposes of describing the subject innovation, but one of ordinary skill in the art may recognize that many further combinations and permutations of the innovation are possible. Accordingly, the innovation is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A film cooled component comprising:
   a movable body having a cavity defined therein, wherein the movable body is exposed to a free stream gas that moves in a direction, wherein the cavity receives a coolant from a coolant source, and
   a plurality of cooling apertures extending between the cavity and an exterior surface of the movable body, wherein the coolant exits the movable body via the cooling apertures and flows over the exterior surface;
   wherein the coolant exits the cavity through the plurality of cooling apertures in a direction that opposes the direction of the free stream gas, thereby providing a cooling effect to the body,
   wherein at least two cooling apertures of the plurality of cooling apertures are located downstream of a step formed in the exterior surface, wherein the step continuously extends in a direction perpendicular to the direction of the free stream gas to overlap with both of the at least two cooling apertures.

2. The film cooled component of claim 1, wherein the blowing ratio is 2.0 or greater.

3. The film cooled component of claim 1, wherein at least one of the plurality of cooling apertures is oriented to the external surface of the body at an angle of at least about 30°.

4. The film cooled component of claim 1, wherein at least one of the plurality of cooling apertures further comprises at least one channel defined on an inside surface.

5. The film cooled component of claim 4, wherein the at least one channel is oriented in a helical direction.

6. The film cooled component of claim 1, wherein the body is a turbine blade.

7. A system that increases a film cooling effectiveness comprising:

a movable film cooled body having a cavity defined therein, wherein the movable body is exposed to a flow of free stream gas, wherein the flow moves in a direction;

at least two cooling apertures defined in an exterior surface of the film cooled body; and a coolant provided to the exterior surface through the at least two cooling apertures from the cavity, wherein the at least two cooling apertures direct the coolant in a direction that opposes the direction of the flow, thereby providing a cooling effect to the body, wherein the at least two cooling apertures are located downstream of a step formed in the exterior surface, wherein the step continuously extends in a direction perpendicular to the direction of the free stream gas to overlap with both of the at least two cooling apertures.

8. The system of claim 7, wherein the blowing ratio is 2.0 or greater.

9. The system of claim 7, wherein the at least one cooling aperture is oriented to an external surface of the body at an angle of at least about 30°.

10. The system of claim 7, wherein one of the at least two cooling apertures further comprises at least one cooling channel.

11. The system of claim 10, wherein the at least one cooling channel includes a plurality of cooling channels, and wherein the plurality of cooling channels are oriented in a same helical direction.

12. The system of claim 7, wherein the body is a turbine blade and the coolant interacts with the free stream gas to cool the exterior surface of the turbine blade thereby facilitating the enhancement of film cooling effectiveness.

13. A method of film cooling a body having an exterior surface exposed to a free stream of gas flowing in a direction, the method comprising:

providing a body containing a plurality of cooling apertures;

providing a coolant that passes through at least two cooling apertures of the plurality of cooling apertures, wherein the at least two cooling apertures are located downstream of a step formed in the exterior surface, wherein the step continuously extends in a direction perpendicular to the direction of the free stream gas to overlap with both of the at least two cooling apertures;

orienting the at least two cooling apertures of the plurality of cooling apertures, such that the direction of the coolant exiting the at least two of the plurality of cooling apertures is opposite the direction of a free stream gas; and cooling the surface of the body to a desired temperature, such that the integrity of the surface is not compromised due to the temperature of the free stream gas.

14. The method of claim 13, further comprising having at least one cooling channel defined on an inside surface of one of the at least two cooling apertures of the plurality of cooling apertures.

15. The method of claim 14, wherein the at least one cooling channel includes a plurality of cooling channels, and wherein the plurality of cooling channels are oriented in a same helical direction.

16. The method of claim 14, wherein the plurality of cooling apertures include a plurality of first cooling apertures having the least one cooling channel oriented in a first direction and a plurality of second cooling apertures having the at least one cooling channel oriented in a second direction that is different from the first direction.

17. The method of claim 13, wherein the body is a turbine blade.

* * * * *